(12) United States Patent
Nishimura et al.

(10) Patent No.: US 9,334,179 B2
(45) Date of Patent: May 10, 2016

(54) WATER TREATMENT DEVICE

(71) Applicant: DAIKIN INDUSTRIES, LTD., Osaka-shi, Osaka (JP)

(72) Inventors: Masaya Nishimura, Shiga (JP); Kenkichi Kagawa, Osaka (JP); Sachiko Yamaguchi, Osaka (JP); Tsunahiro Ohdou, Osaka (JP); Tomoki Saitou, Osaka (JP)

(73) Assignee: Daikin Industries, Ltd., Osaka-shi (JP)

( * ) Notice: Subject to any disclaimer, the term of this patent is extended or adjusted under 35 U.S.C. 154(b) by 0 days.

(21) Appl. No.: 14/430,999

(22) PCT Filed: Sep. 24, 2013

(86) PCT No.: PCT/JP2013/005644
§ 371 (c)(1),
(2) Date: Mar. 25, 2015

(87) PCT Pub. No.: WO2014/050079
PCT Pub. Date: Apr. 3, 2014

(65) Prior Publication Data
US 2015/0251935 A1 Sep. 10, 2015

(30) Foreign Application Priority Data

Sep. 28, 2012 (JP) .................. 2012-218378
Sep. 28, 2012 (JP) .................. 2012-218400
Dec. 28, 2012 (JP) .................. 2012-289120
Dec. 28, 2012 (JP) .................. 2012-289125

(51) Int. Cl.
*C02F 1/44* (2006.01)
*B01D 53/32* (2006.01)
(Continued)

(52) U.S. Cl.
CPC ............ *C02F 1/46104* (2013.01); *B01D 53/32* (2013.01); *B01D 53/326* (2013.01);
(Continued)

(58) Field of Classification Search
CPC .............. C02F 1/46104; C02F 1/4606; C02F 2301/02; C02F 2201/46105; C02F 2303/04; B01D 53/32; B01D 53/326
See application file for complete search history.

(56) References Cited

U.S. PATENT DOCUMENTS 6,071,401 A * 6/2000 Engel .................. B01D 53/326
205/763
6,270,650 B1 8/2001 Kazi et al.
(Continued)

FOREIGN PATENT DOCUMENTS

CZ WO 2009033436 A1 * 3/2009 ............ C02F 1/4608
EP 2 033 708 A1 3/2009
(Continued)

OTHER PUBLICATIONS

International Search Report, issued in PCT/JP2013/005644, dated Nov. 26, 2013.

*Primary Examiner* — Krishnan S Menon
*Assistant Examiner* — Waqaas Ali
(74) *Attorney, Agent, or Firm* — Birch, Stewart, Kolasch & Birch, LLP

(57) ABSTRACT

A water treatment system includes a water treatment unit and insulators. The water treatment unit is provided in an intermediate portion of a water passage allowing target water to flow, and produces bactericidal factors in the target water utilizing a discharge. The insulators are provided at an inflow side and an outflow side of the water treatment unit, respectively, and electrically insulate the water flowing to and out of the water treatment unit from the water treatment unit. The insulator at the inflow side sprays the target water to insulate the water. The insulator at the outflow side allows the target water to fall down from the water treatment unit to insulate the water.

8 Claims, 30 Drawing Sheets

(51) Int. Cl.
*C02F 1/461* (2006.01)
*C02F 1/46* (2006.01)
*C02F 1/48* (2006.01)

(52) U.S. Cl.
CPC ............... *C02F 1/46* (2013.01); *C02F 1/4606* (2013.01); *C02F 1/48* (2013.01); *C02F 2201/46105* (2013.01); *C02F 2301/02* (2013.01); *C02F 2303/04* (2013.01)

(56) References Cited

U.S. PATENT DOCUMENTS

| | | | |
|---|---|---|---|
| 6,309,532 B1 | 10/2001 | Tran et al. | |
| 2006/0060464 A1 | 3/2006 | Chang | |
| 2008/0149475 A1* | 6/2008 | Yamamoto | C02F 1/4672 204/196.01 |
| 2009/0074391 A1* | 3/2009 | Tsai | F24H 9/0021 392/451 |
| 2009/0241579 A1 | 10/2009 | Motegi et al. | |
| 2011/0240539 A1* | 10/2011 | Nose et al. | 210/192 |
| 2015/0125344 A1* | 5/2015 | Kanno | A23L 3/3454 422/29 |
| 2015/0239755 A1* | 8/2015 | Nishimura | C02F 1/4608 204/229.6 |

FOREIGN PATENT DOCUMENTS

| | | | | |
|---|---|---|---|---|
| EP | 2363380 A1 | * | 9/2011 | ............... 210/192 |
| JP | 50-151770 A | | 12/1975 | |
| JP | 58-64182 A | | 4/1983 | |
| JP | 2000-93972 A | | 4/2000 | |
| JP | 2000093972 A | * | 4/2000 | |
| JP | 2001058179 A | * | 3/2001 | |
| JP | 2005-58886 A | | 3/2005 | |
| JP | 2005-529455 A | | 9/2005 | |
| JP | 2005-349314 A | | 12/2005 | |
| JP | 2007-207540 A | | 8/2007 | |
| JP | 2007-307486 A | | 11/2007 | |
| JP | 2011161362 | * | 8/2011 | |
| JP | 2012-75975 A | | 4/2012 | |
| JP | 2012-77918 A | | 4/2012 | |

* cited by examiner

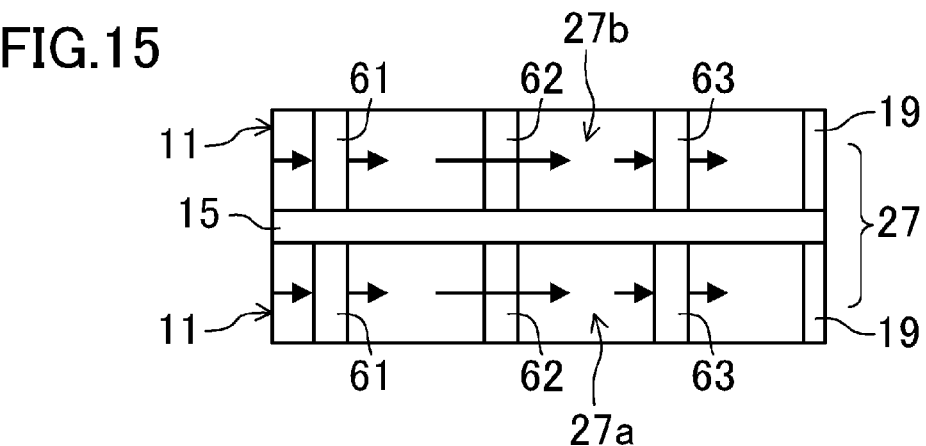
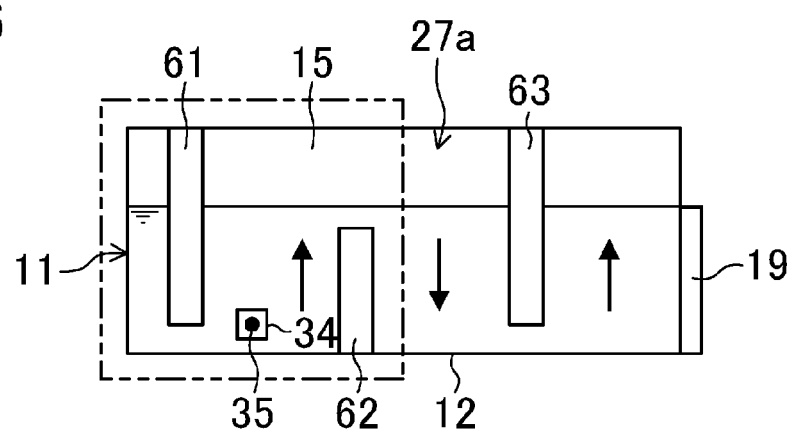
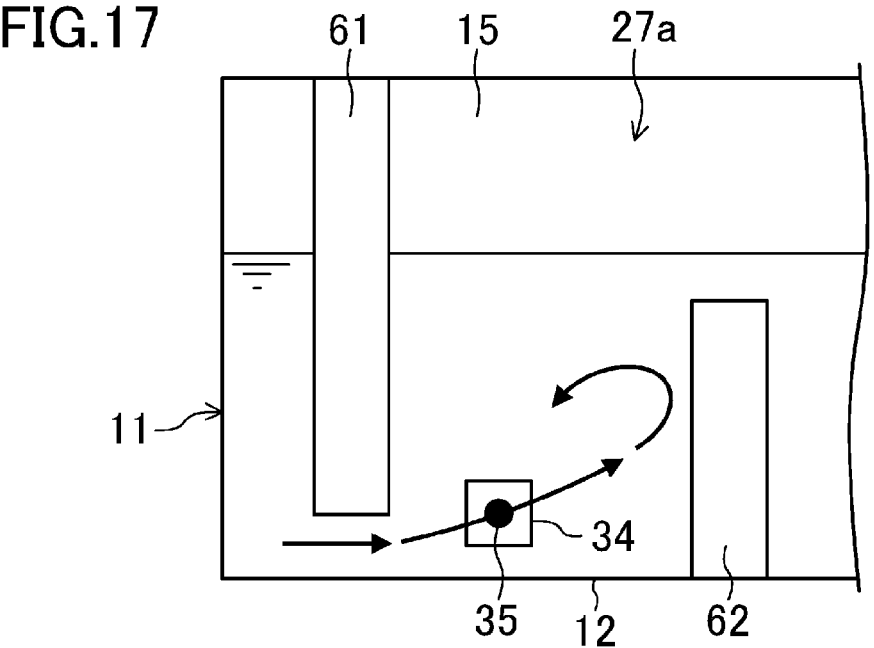

WATER TREATMENT DEVICE

TECHNICAL FIELD

The present invention relates to a water treatment system, and more particularly to an insulating structure.

BACKGROUND ART

Known water treatment systems generate an electric discharge in water in a treatment vessel to purify the water. Patent Document 1 discloses a water treatment system including a positive electrode and a negative electrode in water. A high-voltage pulse is applied to the positive electrode to treat the water flowing between the electrodes.

CITATION LIST

Patent Document

PATENT DOCUMENT 1: Japanese Unexamined Patent Publication No. 2000-093972

SUMMARY OF THE INVENTION

Technical Problem

However, in the above-described water treatment system, both the electrodes are placed in intermediate portions of the water flow. There is thus a problem that a current flows to the water flowing upstream and downstream of the treatment vessel including the electrodes.

The present invention was made in view of the problem. It is an objective of the present invention to prevent a current from flowing out of a water treatment unit.

Solution to the Problem

According to a first aspect of the invention, a water treatment system includes a water treatment unit (210) configured to electrically treat water, and insulators (240 and 250) configured to electrically insulate the water flowing to and out of the water treatment unit (210) from the water treatment unit (210).

In the first aspect of the invention, since the water treatment system includes the insulators (240 and 250), no current flows from the water treatment unit (210) to the water, which flows to and out of the water treatment unit (210). This allows efficient use of the applied electric power.

A second aspect of the invention is an embodiment of the first aspect of the invention in which the water treatment unit (210) is provided in an intermediate portion of a water passage (203) allowing the water to flow. The insulators (240 and 250) are provided at an inflow side and an outflow side of the water treatment unit (210), respectively.

According to the second aspect of the invention, since the insulators (240 and 250) are provided at the inflow side and the outflow side of the water treatment unit (210), no current flows from the water treatment unit (210) to the water at the inflow side and the outflow side of the water treatment unit (210). This allows efficient use of the applied electric power.

A third aspect of the invention is an embodiment of the second aspect of the invention in which the water treatment unit (210) generates a discharge in the water in a treatment vessel (211) to produce bactericidal factors in the water.

According to the third aspect of the invention, the discharge in the water treatment unit (210) produces the bactericidal factors in the water. These bactericidal factors purify the water.

A fourth aspect of the invention is an embodiment of the third aspect of the invention in which, the insulator (240) at the inflow side includes a nozzle configured to drop the water flowing from the water passage (203) to the water treatment unit (210).

According to the fourth aspect of the invention, the water flows as drops from the water passage (203) to the water treatment unit (210), thereby increasing the impedance between the water treatment unit (210) and the water flowing to the water treatment unit (210). This insulates the water treatment unit (210) from the water flowing to the water treatment unit (210).

A fifth aspect of the invention is an embodiment of the third aspect of the invention, the insulator (240) at the inflow side includes a spray unit (240) configured to spray the water flowing from the water passage (203) to the water treatment unit (210).

According to the fifth aspect of the invention, the water flows as mist from the water passage (203) to the water treatment unit (210), thereby increasing the impedance between the water treatment unit (210) and the water flowing to the water treatment unit (210). This insulates the water treatment unit (210) from the water flowing to the water treatment unit (210).

A sixth aspect of the invention is an embodiment of any one of the third to fifth aspects of the invention in which the insulator (250) at the outflow side allows the water flowing from the water treatment unit (210) to the water passage (203) to fall down as drops from the water treatment unit (210).

In the sixth aspect of the invention, the water flows down as the drops, that is, like a fall, from the water treatment unit (210) to the water passage (203), thereby increasing the impedance between the water treatment unit (210) and the water flowing to and out of the water treatment unit (210). This insulates the water treatment unit (210) from the water flowing to and out of the water treatment unit (210).

Advantages of the Invention

According to the present invention, the water treatment system includes the insulators (240 and 250) between the water treatment unit (210) and the water flowing to and out of the water treatment unit (210). This reliably reduces a current flowing from the water treatment unit (210) to the water flowing to and out of the water treatment unit (210), resulting in efficient use of the applied electric power.

According to the second aspect of the invention, the insulators (240 and 250) are provided at the inflow side and the outflow side of the water treatment unit (210). This reliably reduces a current flowing from the water treatment unit (210) to the water flowing upstream and downstream of the water treatment unit (210), resulting in efficient use of the applied electric power.

According to the third aspect of the invention, the discharge in the water treatment unit (210) produces the bactericidal factors in the target water. These bactericidal factors reliably purify the target water.

In the fourth aspect of the invention, the water flows as the drops from the water passage (203) to the water treatment unit (210), thereby increasing the impedance between the water treatment unit (210) and the water flowing to the water treatment unit (210). This reliably insulates the water treatment unit (210) from the water flowing to the water treatment unit (210).

In the fifth aspect of the invention, the water flows as the mist from the water passage (203) to the water treatment unit (210), thereby increasing the impedance between the water treatment unit (210) and the water flowing to the water treatment unit (210). This reliably insulates the water treatment unit (210) from the water flowing to the water treatment unit (210).

In the sixth aspect of the invention, the water flows down as the drops, that is, like a fall, from the water treatment unit (210) to the water passage (203), thereby increasing the impedance between the water treatment unit (210) and the water flowing out of the water treatment unit (210). This reliably insulates the water treatment unit (210) from the water flowing out of the water treatment unit (210).

BRIEF DESCRIPTION OF THE DRAWINGS

FIG. 15 is a top view schematically illustrating a treatment vessel of the second discharge unit according to the second embodiment.

FIG. 16 is a side view schematically illustrating the treatment vessel of the second discharge unit according to the second embodiment.

FIG. 17 is a partially enlarged view of FIG. 16.

DESCRIPTION OF EMBODIMENTS

Embodiments of the present invention will be described hereinafter in detail with reference to the drawings.

First Embodiment of Invention

Figure 1:
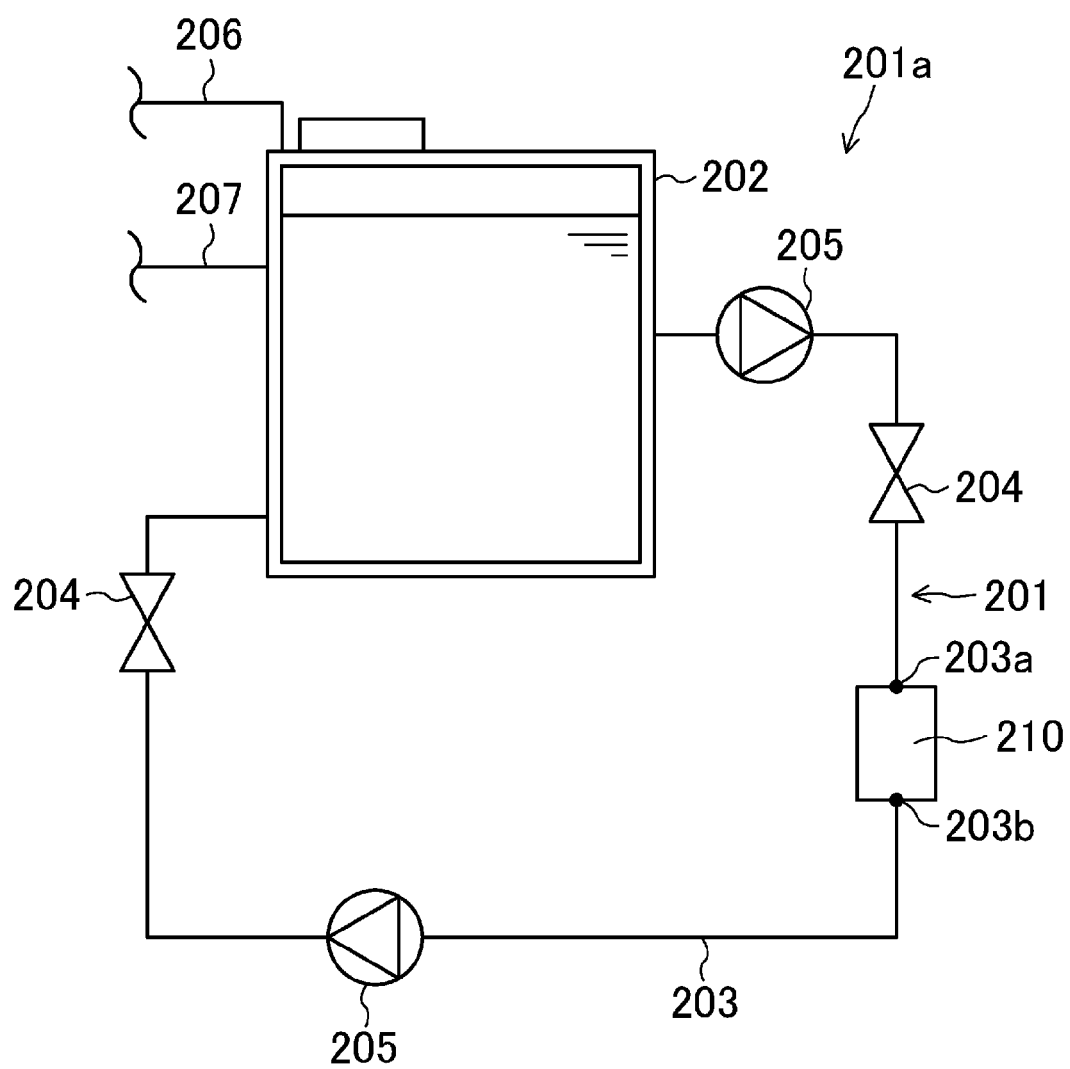
FIG. 1 is a diagram of a piping system illustrating a water treatment system according to a first embodiment.

As shown in FIG. 1, a water treatment system (201a) according to a first embodiment of the present invention includes a water circulation circuit (201) and a water tank (202).

The water tank (202) stores water (including hot water, the same hereinafter). The water tank (202) is connected to the water circulation circuit (201), a first channel pipe (206), and a second channel pipe (207).

The water circulation circuit (201) stirs and circulates the water in the water tank (202). The water circulation circuit (201) is connected to a water pipe (203), two on-off valves (204 and 204), two pumps (205 and 205), and a water treatment unit (210). The specific structure of the water treatment unit (210) will be described later.

The water circulates inside the water pipe (203). One end of the water pipe (203) is connected to the outer surface of the water tank (202). The other end of the water pipe (203) is connected to the surface of the water tank (202) opposite to the outer surface. The water pipe (203) is, at intermediate portions, connected to the two pumps (205 and 205), the two on-off valves (204 and 204), and the water treatment unit (210).

Each on-off valve (204, 204) is configured to open and close the passage of the water pipe (203). One of the two on-off valves (204 and 204) is provided at the inflow side of the water treatment unit (210). The other one is provided at the outflow side of the water treatment unit (210). One of the two pumps (205 and 205) is provided between the on-off valve (204) at the inflow side of the treatment unit (210) and the water tank (202). The other one is provided between the water treatment unit (210) and the on-off valve (204) at the outflow side of the treatment unit (210). When the on-off valve (204, 204) opens, the water circulates inside the water pipe (203). When the on-off valve (204, 204) closes, the water in the water pipe (203) stops circulating.

Structure of Water Treatment Unit

Figure 2:
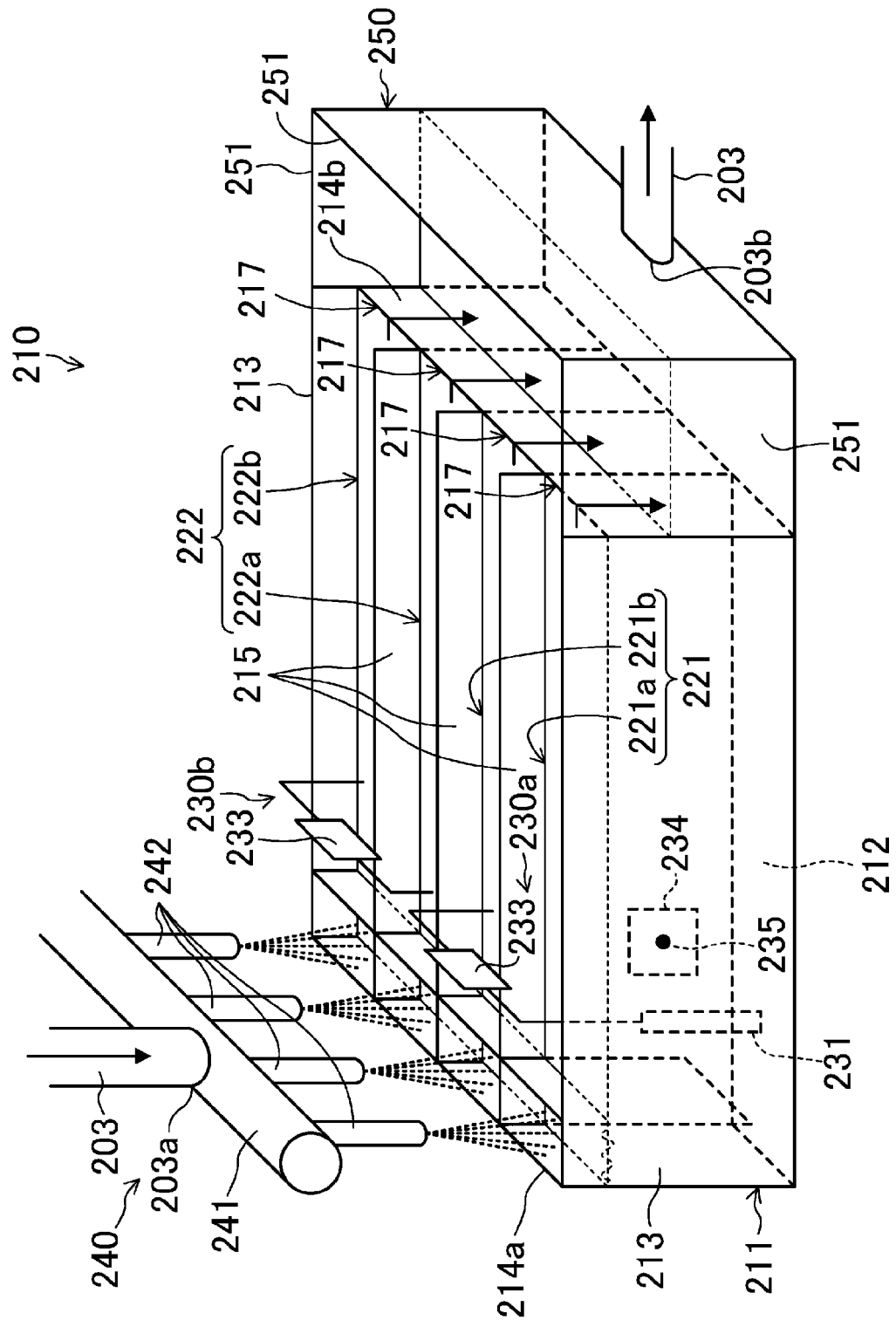
FIG. 2 illustrates a water treatment unit according to the first embodiment.
Figure 3:
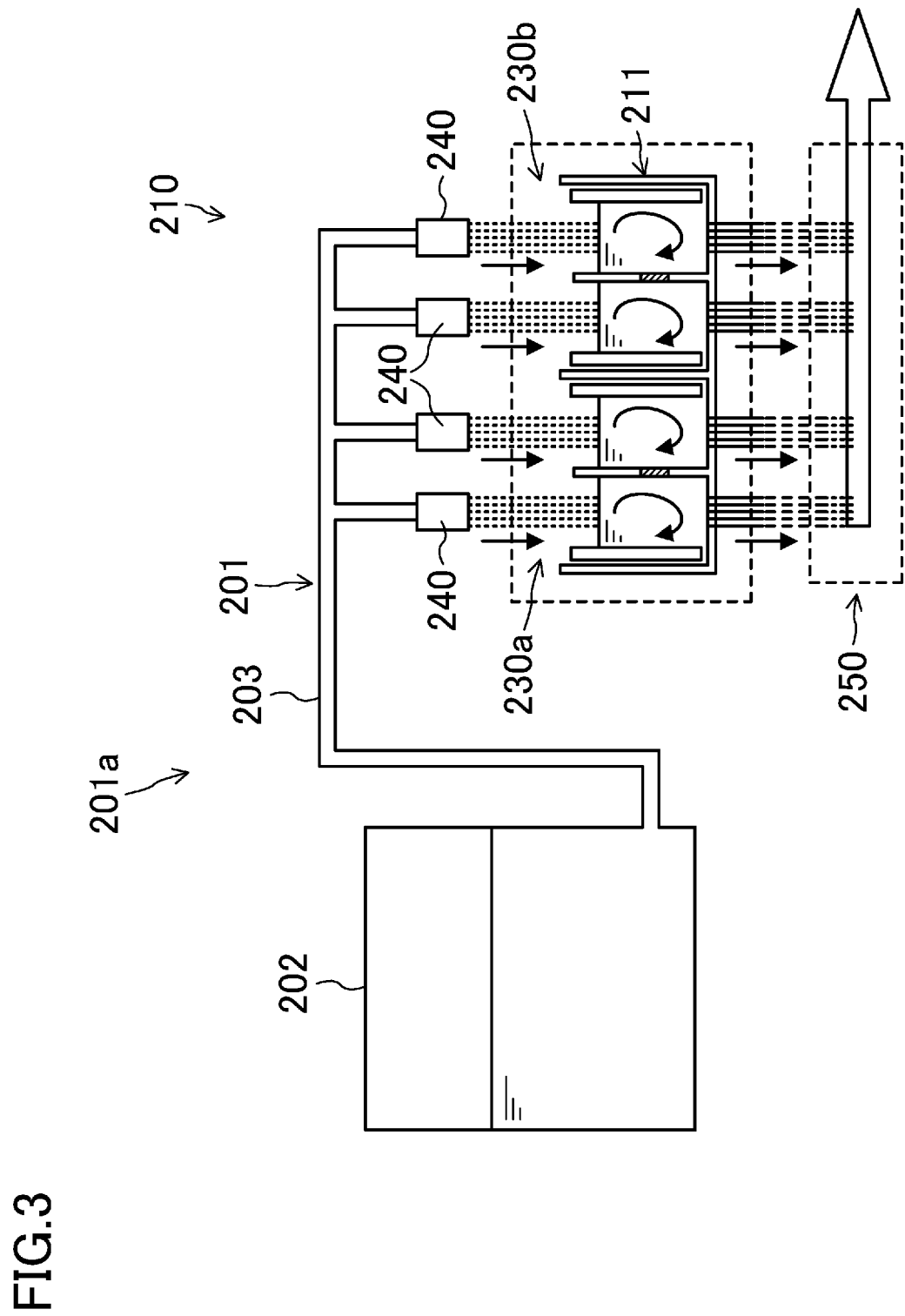
FIG. 3 schematically illustrates the water treatment unit according to the first embodiment.

As shown in FIGS. 2 and 3, the water treatment unit (210) purifies the water flowing from an inlet (203a) of the water pipe (203) and allows the purified water to flow out of an outlet (203b) of the water pipe (203).

The water treatment unit (210) communicates with the inlet (203a) of the water pipe (203) via a spray apparatus (240), and to the outlet (203b) of the water pipe (203) via a downstream vessel (250). This water treatment unit (210) includes a treatment vessel (211) and a plurality of discharge units (230a and 230b). The water treatment unit (210) supplies the water flowing from the water pipe (203) from the spray apparatus (240) to the treatment vessel (211), and purifies the water in the treatment vessel (211) using bactericidal factors produced in the discharge unit (230a, 230b). Then, the purified water flows through the downstream vessel (250) and flows out of the downstream vessel (250) to the water pipe (203).

The treatment vessel (211) is a box-like water vessel formed in a substantially rectangular shape as viewed from above. Specifically, the treatment vessel (211) includes a bottom (212), long walls (213 and 213), and short walls (214a and 214b). The bottom (212) is a flat plate formed in a substantially rectangular shape as viewed from above. Each long wall (213, 213) is a flat plate formed in a horizontally elongated, substantially rectangular shape, and standing upward from one of the long sides of the bottom (212). Each short wall (214a, 214b) is a flat plate formed in a vertically elongated, substantially rectangular shape, and standing upward one of the short sides of the bottom (212). As compared to the short wall (214a) of the treatment vessel (211) at one longitudinal end (i.e., the inflow side) and the long walls (213 and 213), the short wall (214b) of the treatment vessel (211) at the other longitudinal end (i.e., the outflow side) is formed low, thereby forming outlets (217).

Inside the treatment vessel (211), a plurality of dividers (215) are arranged in the width direction at predetermined intervals. Each divider (215) is a flat plate formed in a substantially rectangular shape, which is laterally long. The dividers (215) are arranged along the length of the treatment vessel (211) to divide the inside of the treatment vessel (211) into a plurality of lanes (221a-222b). The dividers (215) are made of an electrically insulating material. A hole (216) is cut in the divider (215, 215) in each of a first path (221) and a second path (222), which will be described later. The hole (216) penetrates the associated divider (215, 215) in the thickness direction. In the treatment vessel (211), the dividers (215) form first to fourth lanes (221a-222b) arranged in this order from the bottom of the paper of FIG. 2. The number of the lanes (221a-222b) formed in the treatment vessel (211) is a mere example and may be changed as appropriate in accordance with the amount of the water purified by the water treatment unit (210). The divider (215) serves as the dividing member according to the present invention.

Out of the lanes (221a-222b), the pair of the first and second lanes (221a and 221b) forms the first path (21), and the pair of the third and fourth lanes (222a and 222b) forms the second path (222).

Figure 4:
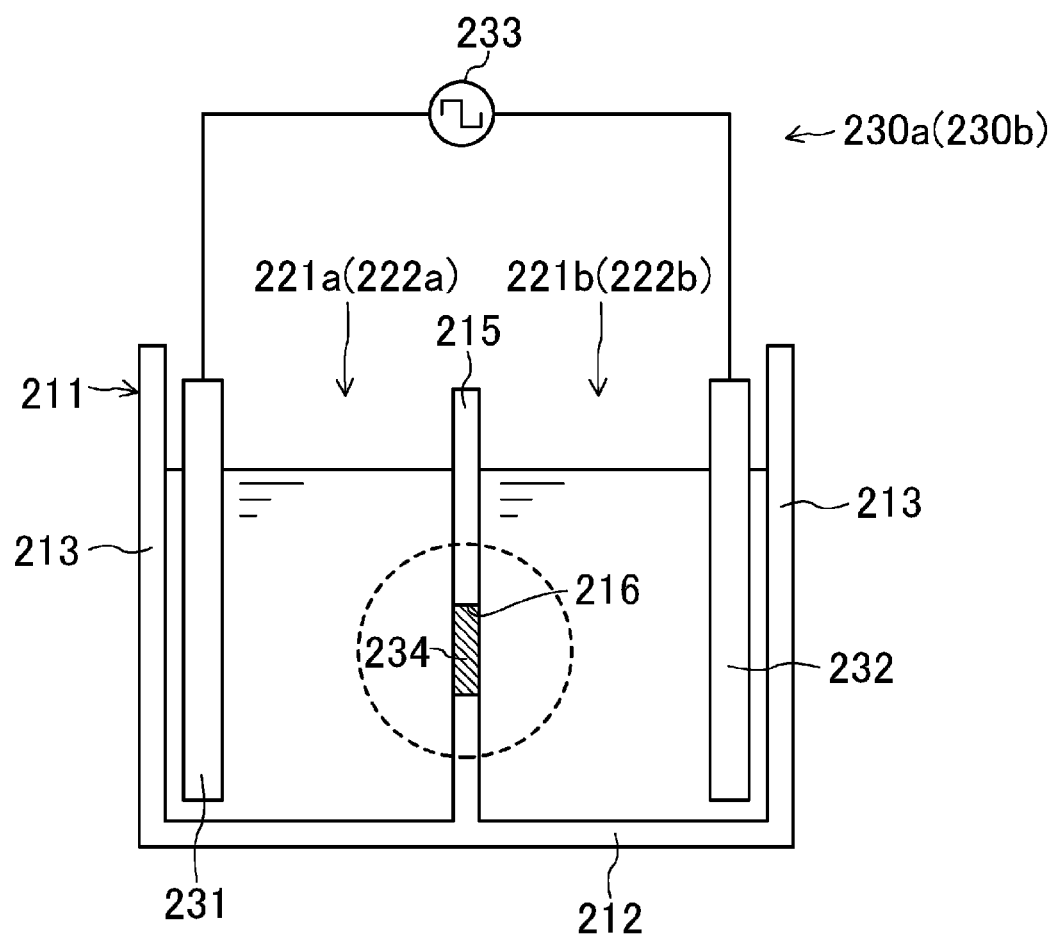
FIG. 4 is a schematic cross-sectional view illustrating a discharge unit according to the first embodiment.

As shown in FIG. 4, the plurality of discharge units (230a and 230b) includes a first discharge unit (230a) and a second discharge unit (230b). Each discharge unit (230a, 230b) is provided for one of the above-described pairs of lanes (221a and 221b, 222a and 222b).

The first discharge unit (230a) purifies the water in the first path (221). The first discharge unit (230a) includes a pair of electrodes (231 and 232), a high-voltage generator (233), and the divider (215) with the above-described hole (216). The high-voltage generator (233) is connected to the pair of electrodes (231 and 232) and applies a predetermined voltage to the pair of electrodes (231 and 232). The divider (215) includes a discharge member (234). The second discharge unit (230b) purifies the water in the second path (222). The specific structure of the second discharge unit (230b) is similar to that of the first discharge unit (230a), and the explanation thereof will be omitted.

The pair of electrodes (231 and 232) generates a discharge in water, and includes a hot-side electrode (231) and a neutral-side electrode (232). The electrode (231) is a flat plate placed in the first lane (221a). The electrode (231) is connected to the high-voltage generator (233). The electrode (232) is a flat plate placed in the second lane (221b). The electrode (232) is connected to the high-voltage generator (233). The electrode (231) is substantially parallel to the electrode (232). The electrodes (231 and 232) are made of, for example, a metal material which is highly resistant to corrosion.

Figure 5:
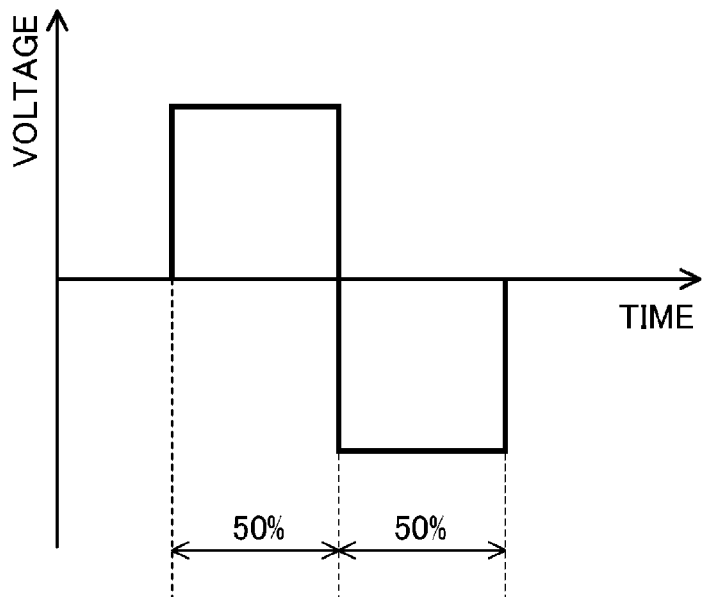
FIG. 5 illustrates the waveform of a voltage generated by a high-voltage generator according to the first embodiment.

The high-voltage generator (233) is a power source applying a predetermined voltage to the pair of electrodes (231 and 232). In this first embodiment, an example will be described where the high-voltage generator (233) applies a voltage with an alternating waveform, which alternates between positive and negative values, to the pair of electrodes (231 and 232) as shown in FIG. 5. The duty of the alternating waveform (a square wave) is controlled to have the same positive and negative excursions. The voltage applied to the pair of electrodes (231 and 232) is a mere example. The waveform does not have to be the square wave and may be a sine wave as long as the voltage is an alternating voltage.

Figure 6:
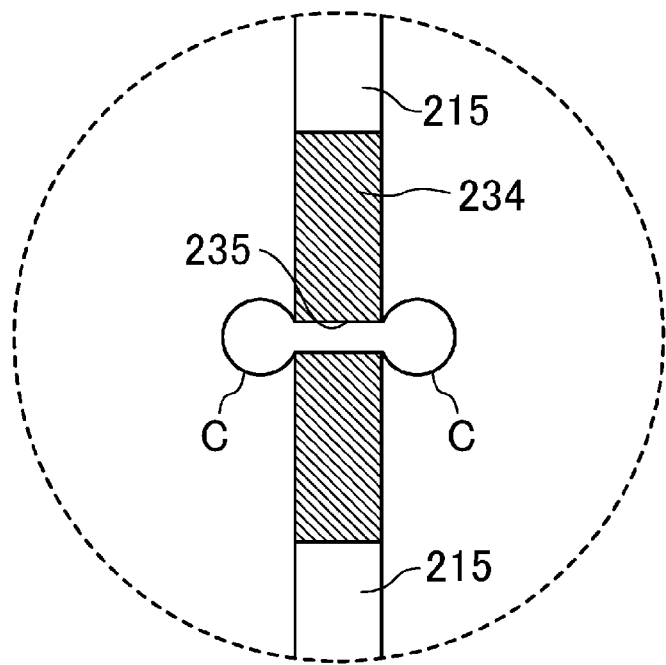
FIG. 6 is a partial enlarged view of the discharge unit according to the first embodiment.

The discharge member (234) is a plate-like insulating member. The discharge member (234) is made of an electrically insulating material such as a ceramic material. The discharge member (234) closes the hole (216) of the divider (215) separating the first lane (221a) and the second lane (221b). A small discharge hole (235) is cut almost in the center of the discharge member (234). The discharge hole (235) is designed to have, for example, an electrical resistance of several MΩ. The discharge hole (235) defines a path of current to flow between the electrode (231) and the electrode (232). The discharge hole (235) described above serves as a density of current concentrator, which increases the density of current in the path of current to flow between the pair of electrodes (231 and 232). As shown in FIG. 6, when a voltage is applied to the electrode (231) and the electrode (232), the density of current in the path of current increases such that Joule heat vaporizes the water in the discharge hole (235) of the discharge member (234) to produce bubbles (C). Then, the interface between each bubble (C) and the water serves as an electrode to generate an electric discharge. In this discharge, since the electrode (231) and the electrode (232) do not serve as the discharge electrodes, the electrodes (231 and 232) are less degraded by the discharge.

The spray apparatus (240) is connected to the water pipe (203), and sprays the water flowing from the inlet (203a) of the water pipe (203) to supply the water to the treatment vessel (211). The spray apparatus (240) serves as the insulator according to the present invention. The spray apparatus (240) includes a nozzle header (241), and a plurality of spray nozzles (242) associated with the lanes (221a-222b).

The nozzle header (241) is an elongated pipe orthogonal to the water pipe (203). The nozzle header (241) is, at the side surface, connected to the water pipe (203) and divides the water from the water pipe (203) into the spray nozzles (242).

The plurality of spray nozzles (242) are provided at predetermined intervals in the longitudinal direction of the nozzle header (241). Each of the spray nozzles (242) is provided for an associated one of the lanes (221a-222b). The water flowing through the water pipe (203) flows from the inlet (203a) to the nozzle header (241), and is sprayed as particles (or droplets) from the spray nozzles (242) to the associated lanes (221a-222b). At this time, since the water sprayed from the spray nozzles (242) become the particles (or the droplets), air is interposed between the particles (or between the droplets) to increase the electrical resistance. This electrically insulates the water flowing from the inlet (203a) of the water pipe (203) from the water flowing through the treatment vessel (211). The spraying with the spray nozzles (242) generates an electrical resistance of hundreds of MΩ or more between the water at the inlet (203a) of the water pipe (203) and the water in the treatment vessel (211).

The downstream vessel (250) is a water vessel provided at the outflow side of the treatment vessel (211). The water flows down from the treatment vessel (211) and flows as drops into the downstream vessel (250). The downstream vessel (250) is a box in a substantially rectangular shape as viewed from above. One side surface is surrounded by outer walls (251). The outer walls (251) of the downstream vessel (250) has the same height as the long wall (213) and the inflow-side short wall (214a) of the treatment vessel (211). The downstream vessel (250) is connected to the outlet (203b) of the water pipe (203). The outflow-side short wall (214b) of the treatment vessel (211) separates the downstream vessel (250) from the treatment vessel (211). Since the short wall (214b) includes the outlets (217), the water stored in the treatment vessel (211) energetically flows down like a fall from the outlets (217) toward the bottom of the downstream vessel (250) before the treatment vessel (211) is filled up. There is a predetermined height between the outlets (217) and the bottom of the downstream vessel (250) or the surface of the water stored in the downstream vessel (250). Thus, the water in the treatment vessel (211) becomes drops when flowing down from the outlets (217) to the downstream vessel (250). The water flowing down to the downstream vessel (250) become the drops (i.e., the particles or the droplets), thereby interposing the air between the particles (or between the droplets) to increase the electrical resistance. This electrically insulates the water stored in the treatment vessel (211) from the water flowing through the downstream vessel (250). The electrical resistance between the treatment vessel (211) and the downstream vessel (250) is hundreds of MΩ or more. After that, the water flowing through the downstream vessel (250) flows out of the outlet (203b) of the water pipe (203). The water flowing down from the outlet (217) flows, as the particles, into the downstream vessel (250), which serves as the insulator according to the present invention.

Operation

In the water treatment system (201a) according to this first embodiment, the water treatment unit (210) treats the water flowing through the water pipe (203).

Before the water treatment unit (210) starts operating, the on-off valves (204 and 204) of the water circulation circuit (201) open so that the water in the water tank (202) flows through the water pipe (203). The water flowing through the water pipe (203) flows from the inlet (203a) via a pump (205) into the nozzle header (241) and is sprayed from the spray nozzles (242) to the lanes (221a-222b). Then, the water is stored in the treatment vessel (211). At this time, since the sprayed water is the particles (or the droplets), the air is interposed between the particles (or between the droplets) to increase the electrical resistance. This electrically insulates the water flowing from the inlet (203a) of the water pipe (203) from the water flowing through the treatment vessel (211).

At the water treatment unit (210) starts operating, the treatment vessel (211) contains water. The high-voltage generator (233) applies to the pair of electrodes (231 and 232), a voltage with a square wave having the same positive and negative excursions. This increases the density of current in the path of current of the discharge hole (235) of the discharge member (234).

With an increase in the density of current in the path of current of the discharge hole (235), the Joule heat inside the discharge hole (235) increases. Then, the vaporization of the water progresses to produce the bubbles (C) in the vapor phase inside and near the inlet and the outlet of the discharge hole (235) of the discharge member (234). As shown in FIG. 6, each bubble (C) entirely covers the end of the discharge hole (235). In this state, the bubbles (C) function as the resistor hindering the electrical conduction between the electrode (231) and the electrode (232) via the water. There is then almost no potential difference between each electrode (231, 232) and the water, and the interface between each bubble (C) and the water serves as an electrode. This causes dielectric breakdown inside the bubble (C) to generate an electric discharge (i.e., a spark discharge).

As described above, when an electric discharge is generated in the bubble (C), bactericidal factors (e.g., active species such as hydroxyl radicals) are produced in the water in the treatment vessel (211). Hydroxyl radicals are the bactericidal factors according to the present invention.

After that, the water flowing through the lanes (221a-222b) of the treatment vessel (211) flows down from the outlets (217) to the downstream vessel (250). At this time, the water flowing down from the outlets (217) to the downstream vessel (250) becomes drops, thereby interposing the air between the particles (or between the droplets) to increase the electrical resistance. This electrically insulates the water stored in the treatment vessel (211) from the water flowing through the downstream vessel (250).

Advantages of First Embodiment

In this first embodiment, the insulator (240, 250) is provided between the water treatment unit (210) and the target water flowing to the water treatment unit (210). This reliably reduces a current flowing from the water treatment unit (210) to the target water, which flows to and out of the water treatment unit (210). Then, the discharge is reliably generated in the water in the water treatment unit (210), and the applied electric power is efficiently used.

The insulators (240 and 250) are provided at the inflow side and the outflow side of the water treatment unit (210), respectively. This reliably reduces a current flowing from the water treatment unit (210) to the target water flowing upstream and downstream of the water treatment unit (210). Then, the discharge is more reliably generated in the water in the water treatment unit (210), and the applied electric power is efficiently used.

The discharge in the water treatment unit (210) produces the bactericidal factors in the target water. These bactericidal factors reliably purify the target water.

The target water flows as the mist from the water passage (203) to the water treatment unit (210), thereby increasing the impedance between the water treatment unit (210) and the target water flowing to the water treatment unit (210). This reliably insulates the water treatment unit (210) from the target water flowing to the water treatment unit (210).

The target water flows as the drops like a fall from the water treatment unit (210) to the water passage (203), thereby increasing the impedance between the water treatment unit (210) and the target water flowing to the water treatment unit (210). This reliably insulates the water treatment unit (210) from the target water flowing to the water treatment unit (210).

The bubbles (C) are produced in the discharge hole (235) provided between the pair of electrodes (231 and 232) to generate the electric discharge in the bubbles (C). Accordingly, the discharge electrodes are formed at the interface between each bubble (C) and the water. This reduces deposition of metal, etc., from the pair of electrodes (231 and 232).

Since the first to fourth lanes (221a-222b) are provided, the amount of the water treated by the water treatment system (201a) is controlled in accordance with the number of the lanes (221a-222b).

Since the high-voltage generator (233) is of the alternating type, the voltage applied to the pair of electrodes (231 and 232) alternates between the positive and negative values at regular intervals. Thus, in the discharge hole (235), the spark discharge is generated with no glow discharge generated. Specifically, in the case of the DC current, the form of the discharge changes from a spark discharge to a glow discharge with an increase in the current. In this first embodiment, however, since the polarity of the voltage applied to the pair of electrodes (231 and 232) alternates from positive to negative, or vice versa, before the form of the discharge changes to the glow discharge, the spark discharge is continuously generated in the discharge hole (235) with no glow discharge generated. This embodiment prevents thermal destruction in the discharge hole (235), which is caused by a glow discharge, to reduce an increase in the size of the discharge hole (235). This results in a highly stabilized discharge.

Since the waveform of the voltage has the same positive and negative excursions, each electrode (231, 232) causes oxidation reaction and reduction reaction uniformly. This reduces elution of metal from the pair of electrodes (231 and 232) due to the oxidation reaction. The alternating waveform of the voltage generated by the high-voltage generator (233) reduces deposition of metal, etc., from the electrode (231, 232).

Since the waveform of the voltage is a square wave, an electric discharge is generated without depending on the conductivity of the water unlike a sine wave, for example. This results in a highly stabilized discharge.

Second Embodiment of Invention

Figure 7:
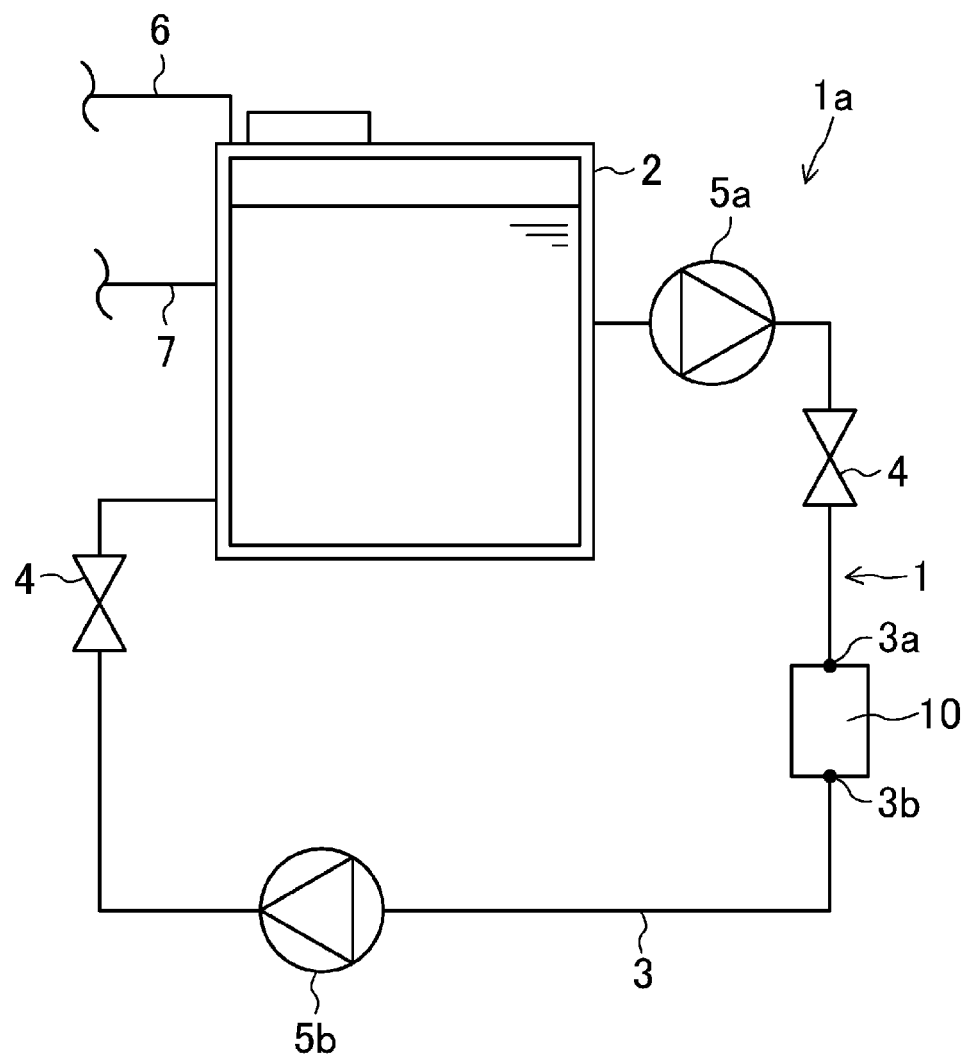
FIG. 7 is a diagram of a piping system of a water treatment system according to a second embodiment.

As shown in FIG. 7, a water treatment system (1a) according to the second embodiment of the present invention includes a water circulation circuit (1) and a water tank (2) as in the first embodiment.

The water tank (2) stores water (including hot water, the same hereinafter). The water tank (2) is connected to the water circulation circuit (1), a first channel pipe (6), and a second channel pipe (7).

The water circulation circuit (1) stirs and circulates the water in the water tank (2). In the water circulation circuit (1), a water pipe (water passage) (3), two on-off valves (4 and 4), two pumps (5a and 5b), and a water treatment unit (10) including a plurality of discharge units are connected together. The specific structure of the water treatment unit (10) will be described later.

The water circulates inside the water pipe (3). One end of the water pipe (3) is connected to one side surface of the water tank (2). The other end of the water pipe (3) is connected to the other side surface of the water tank (2). The water pipe (3) is, at intermediate portions, connected to the two pumps (5a and 5b), the two on-off valves (4 and 4), and the water treatment unit (10).

The on-off valves (4 and 4) are configured to open and close the path of the water pipe (3). One of the two on-off valves (4 and 4) is provided at the inflow side of the water treatment unit (10). The other one is provided at the outflow side of the outflow water pump (5b). When the on-off valve (4, 4) opens, the water circulates inside the water pipe (3). When the on-off valve (4, 4) closes, the water in the water pipe (3) stops circulating.

Structure of Water Treatment Unit

Figure 8:
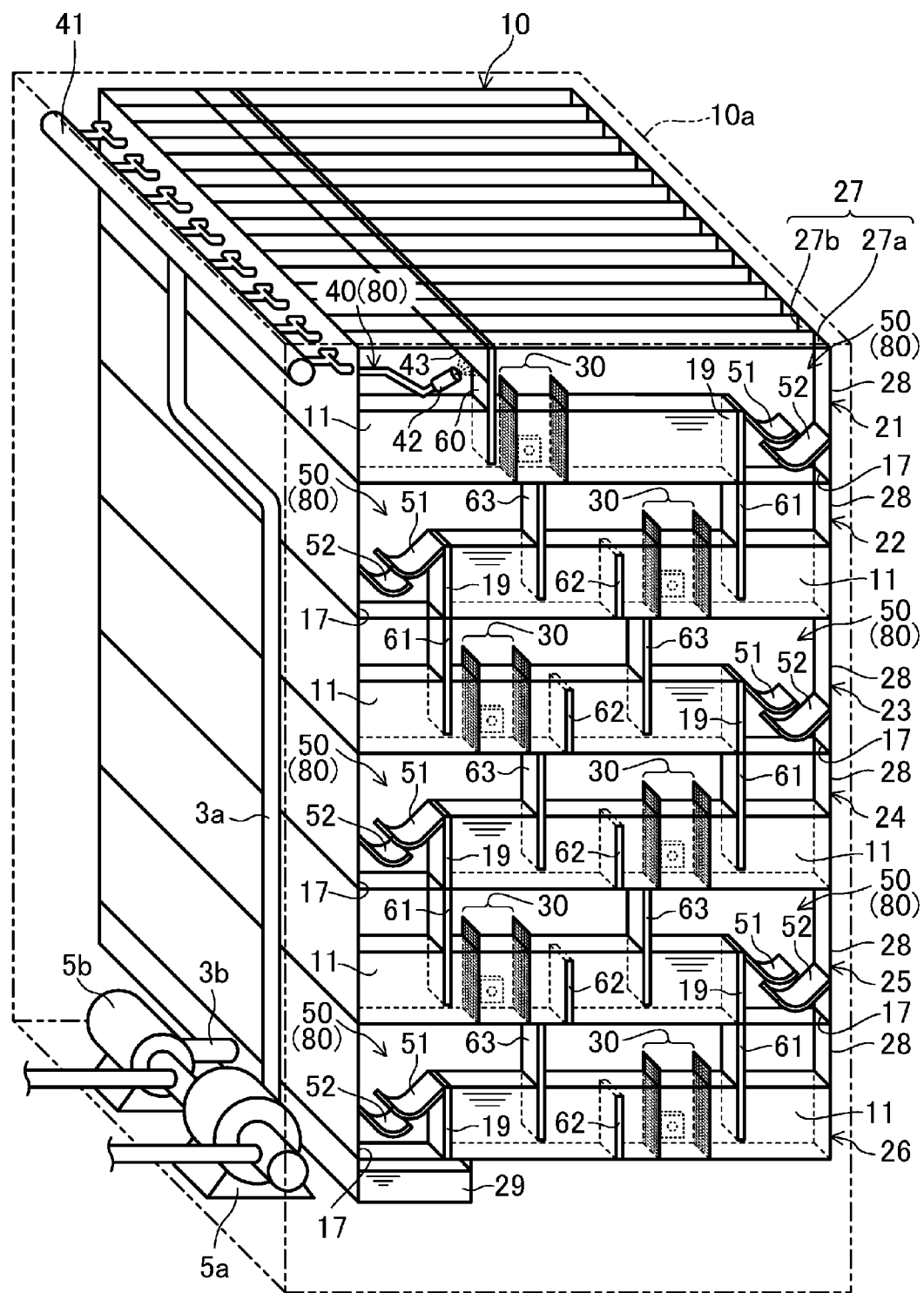
FIG. 8 is a perspective view schematically illustrating a water treatment unit according to the second embodiment.
Figure 9:
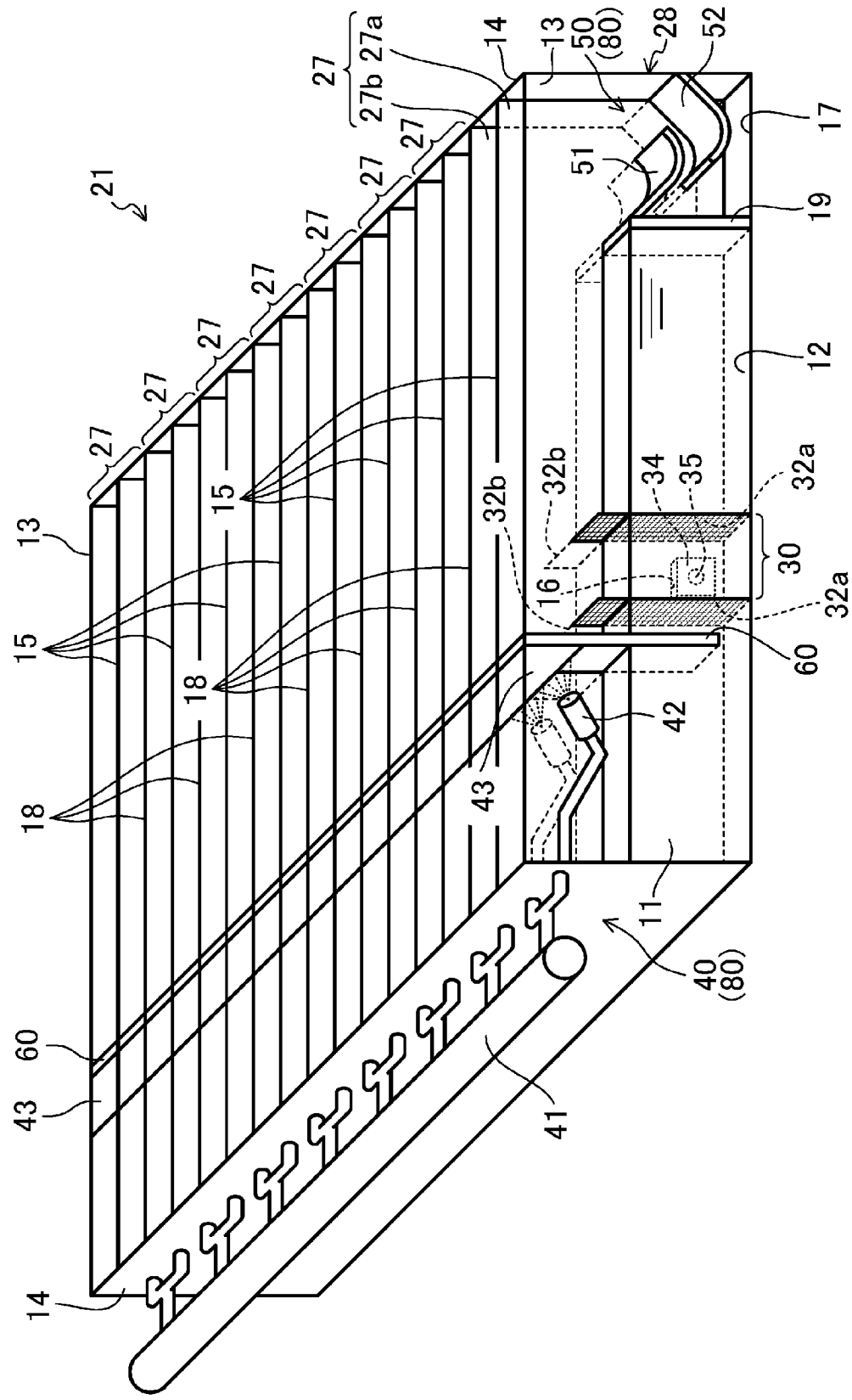
FIG. 9 is a perspective view schematically illustrating a first discharge unit according to the second embodiment.

As shown in FIGS. 8 and 9, the water treatment unit (10) is connected to an inlet pipe (3a) and an outlet pipe (3b), which are parts of the water pipe (3). The water treatment unit (10) purifies the water flowing from the inlet pipe (3a) and allows the purified water to flow out of the outlet pipe (3b). This water treatment unit (10) is housed in a casing (10a) together with the above-described two pumps (5a and 5b). The inlet pipe (3a) communicates with an inflow water pump (5a), while the outlet pipe (3b) communicates with an outflow water pump (5b).

The water treatment unit (10) includes first to sixth discharge units (21-26). Each of the six discharge units (21-26) has a water vessel (28) including segmented paths (27) inside. The water vessels (28) are vertically arranged. The six discharge units (21-26) are stacked one on another to form the water treatment unit (10). The six discharge units (21-26) are, from top to bottom: a first discharge unit (21), a second discharge unit (22), a third discharge unit (23), a fourth discharge unit (24), a fifth discharge unit (25), and a sixth discharge unit (26). The six discharge units (21-26) are slidable in a predetermined horizontal direction, for example, via guide rails. Each discharge unit (21-26) is detachable.

First Discharge Unit

As shown in FIG. 9, the first discharge unit (21) includes a water vessel (28), a spray apparatus (40), and a plurality of discharge sections (30). The first discharge unit (21) purifies the water flowing from the water pipe (3) in the paths (27) and allows the purified water to flow to the second discharge unit (22) at the lower stage. In the following description, the extending direction of the paths (27) of the water treatment unit (10), that is, the horizontal direction of FIG. 9 is referred to as a "horizontal" direction, while the width direction of the paths (27), that is, the depth direction in FIG. 9 is referred to as a "front-back" direction.

The water vessel (28) is a box in a rectangular shape as viewed from above. Specifically, the water vessel (28) has a bottom (12), two long walls (13 and 13), and two short walls (14 and 14). The bottom (12) is a flat plate as viewed from above. The two long walls (13 and 13) are substantially rectangular flat plates, which extend upward from both the front-back ends of the bottom (12) to face each other. On the other hand, the two short walls (14 and 14) are substantially rectangular flat plates, which extend upward from both the horizontal ends of the bottom (12) to face each other. In FIG. 9, the long wall (13) at the front is shown transparently.

A plurality of partitions (18, ..., 18) are provided at predetermined intervals inside the water vessel (28) in the width direction. In this embodiment, the partitions (18, ..., 18) are seven flat plates in the same shape as the long walls (13 and 13). The seven partitions (18, ..., 18) are parallel to the long walls (13 and 13), and segment the inside of the water vessel (28) into eight paths (27). The partitions (18, ..., 18) are made of an electrically insulating material.

A divider (15) is placed in the middle of each of the eight paths (27) segmented by the partitions (18, ..., 18) in the width direction of the path. The eight dividers (15, ..., 15) are eight flat plates in the same shape as the long walls (13 and 13). The eight dividers (15, ..., 15) are parallel to the partitions (18, ..., 18) and divides the inside of each path (27) into two lanes (27a and 27b) extending in the width direction. In short, each path (27) is divided into a first lane (27a) and a second lane (27b) by one of the dividers (15). The dividers (15, ..., 15) are made of an electrically insulating material. Each divider has a hole (16) penetrating the divider along the thickness of the divider.

With this structure, the water vessel (28) includes the seven partitions (18, ..., 18) forming the eight paths (27), and each of the eight paths (27) is divided by the divider (15) into the two lanes (27a and 27b). That is, in the water vessel (28), the partitions (18, ..., 18) and the dividers (15, ..., 15) define 16 lanes (27a, 27b, ..., 27a, 27b). The number of the paths (27) divided from the water vessel (28) is a mere example, and may be changed appropriate in accordance with the amount of the water purified by the water treatment unit (10).

Each lane (27a, 27b) includes a dam plate (19). The dam plate (19) is a flat plate located downstream of the lane (27a, 27b) (i.e., on the right side in the horizontal direction in FIG. 9). The dam plate (19) is the flat plate having a smaller vertical length than the short walls (14 and 14). The lower end of the dam plates (19) is in contact with the bottom (12). In each lane (27a, 27b), the dam plate (19) defines a treatment vessel (11) located upstream of the dam plate (19), and an outflow section (50) located downstream of the dam plate (19). The treatment vessel (11) temporarily stores the water. The water from the treatment vessel (11) flows into the outflow section (50). With this structure, the water flowing to each lane (27a, 27b) is stored in the treatment vessel (11). When the water level reaches the upper end of the dam plate (19), the water flows over the dam plate (19) and flows down like a fall to the outflow section (50).

The treatment vessel (11) of the lane (27a, 27b) includes a path control plate (60) controlling the flow of the water. The path control plate (60) has approximately the same width as the lane (27a, 27b). The path control plate (60) is a flat plate having a smaller vertical length than the short walls (14 and 14). Upstream of each treatment vessel (11) (i.e., on the left in the horizontal direction in FIG. 9), the upper end of the path control plate (60) is located at a position higher than the upper end of the dam plate (19), and the lower end of the path control plate (60) is located at a position higher than the bottom (12).

The treatment vessel (11) of each lane (27a, 27b) includes a spray nozzle (42) of the spray apparatus (40), and a reflector (43) located upstream (on the left of FIG. 9) of the path control plate (60). The reflector (43) reflects the water sprayed from the spray nozzle (42). On the other hand, a discharge section (30) is placed in the water flowing downstream (on the right of FIG. 9) of the path control plate (60).

The outflow section (50) of each lane (27a, 27b) includes an outlet (17) for discharging the water, which has flown into the outflow section (50), to the second discharge unit (22) at the lower stage. The outlet (17) is formed by forming an opening in the bottom (12) of the water vessel (28). The outflow section (50) of the lane (27a, 27b) includes a first slope (51) and a second slope (52). Each of the first and second slopes (51 and 52) is curved in a J-shape. The first slope (51) is attached to the upper end of the dam plate (19), allows the water flowing over the dam plate (19) to obliquely fall down, and splashes the water obliquely upward at the curve. On the other hand, the second slope (52) is attached to the short wall (14) at a position lower than the associated first slope (51). The second slope (52) is located at the position, at which it can receive the water splashed by the first slope (51). The second slope (52) allows the water to obliquely flow down, that is, to the opposite side to the first slope (51), and splashes the water obliquely upward at the curve. While the details will be described later, each outflow section (50) serves as the insulator (80) according to the present invention.

The spray apparatus (40) is connected to the water pipe (3), and sprays and supplies the water flowing from the inlet pipe (3a) of the water pipe (3) to the first discharge unit (21). The spray apparatus (40) includes the nozzle header (41), the spray nozzles (42), and the plurality of reflectors (43). The number of the spray nozzles (42) corresponds to the number of the lanes (27a and 27b) (16 in this second embodiment). Each of the reflectors (43) is provide for an associated one of the spray nozzles (42). While the details will be described later, the spray apparatus (40) serves as the insulator (80) according to the present invention.

The nozzle header (41) is an elongated pipe, which is connected to the inflow water pump (5a) via the inlet pipe (3a).

The plurality of spray nozzles (42) are arranged at predetermined intervals along the length of the nozzle header (41). Each of the spray nozzles (42) is provided for an associated one of the lanes (27a and 27b), and are arranged at an angle facing obliquely upward to spray the water obliquely upward.

Each reflector (43) is a triangular columnar body, which is fixed to the surface of the path control plate (60) of the associated lane (27a, 27b) located upstream at a position higher than the associated spray nozzle (42). The reflector (43) reflects the water sprayed obliquely upward from the spray nozzle (42). The reflector (43) may be in any shape as long as it reflects the water sprayed obliquely upward from the spray nozzle (42). The reflector (43) does not have to be a columnar body and may be a flat plate or a curved plate.

Figure 10:
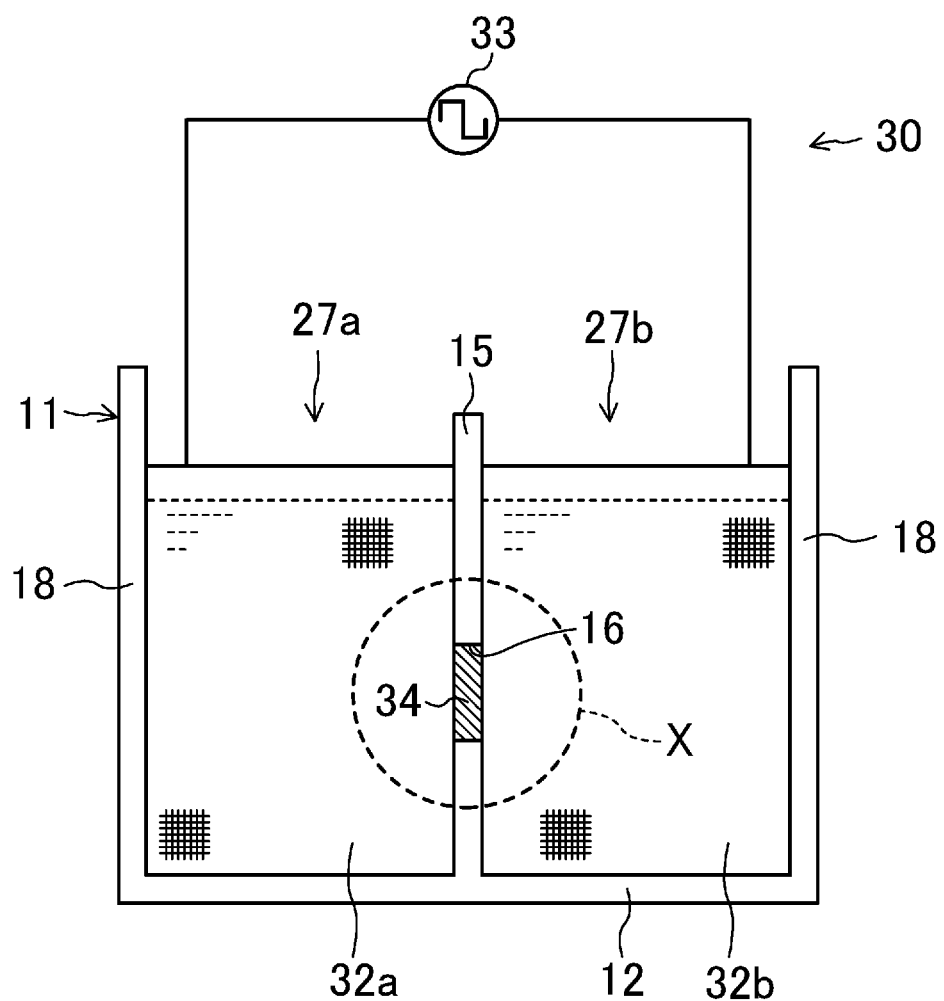
FIG. 10 is a schematical structural view of a discharge section according to the second embodiment.

As shown in FIG. 10, one of the discharge sections (30) is placed for each path (27) to purify the water in the path (27). Each discharge section (30) includes a pair of electrodes (32a and 32b), a high-voltage generator (33), and a discharge member (34). The high-voltage generator (33) applies a predetermined voltage to the pair of electrodes (32a and 32b).

The discharge member (34) is located in a hole (16) of the above-described divider (15).

The pair of electrodes (32a and 32b) generates a discharge in water, and includes two first electrodes (32a) at a hot side and two second electrodes (32b) at a neutral side. Each first electrode (32a) is an electrically conductive member made of a flat rectangular mesh. In the first lane (27a), the first electrodes (32a) are parallel to the path control plate (60). The two first electrodes (32a) are connected to the high-voltage generator (33) generating a high voltage. Each second electrode (32b) is an electrically conductive member made of a rectangular mesh. In the second lane (27b), the second electrodes (32b) are parallel to the path control plate (60). The two second electrode (32b) are connected to the high-voltage generator (33) generating a high voltage. The positions of the first and second electrodes (32a and 32b) correspond to each other in the lanes (27a and 27b). The electrodes (32a and 32b) are, made of, for example, a metal material which is highly resistant to corrosion.

Figure 11:
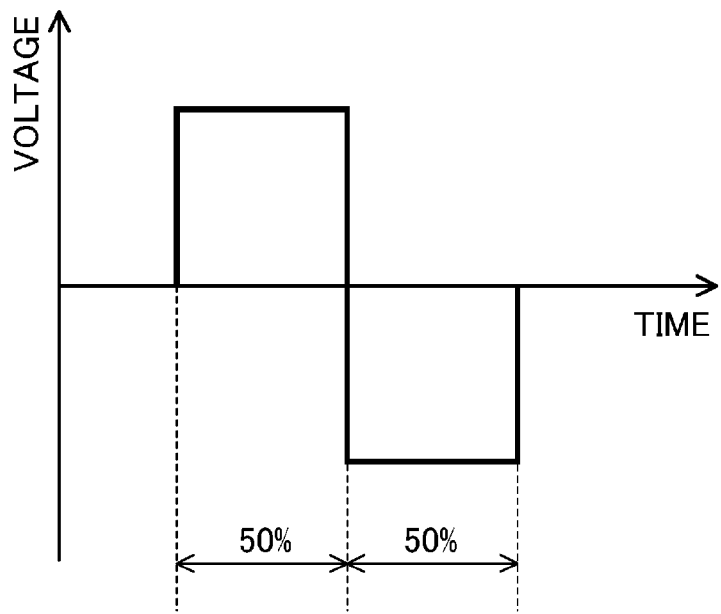
FIG. 11 is a graph illustrating the waveform of a voltage generated by a power source according to the second embodiment.

The high-voltage generator (33) is a power source applying a predetermined voltage to the pair of electrodes (32a and 32b). In this embodiment, an example will be described where the high-voltage generator (33) applies a high voltage with an alternating square waveform, which alternates between positive and negative values, to the pair of electrodes (32a and 32b) as shown in FIG. 11. The duty of the square wave is controlled to have the same positive and negative excursions. The voltage applied to the pair of electrodes (32a and 32b) is a mere example. The waveform does not have to be the square wave and may be a sine wave as long as the voltage is an alternating voltage.

The discharge member (34) is a plate-like insulating member. The discharge member (34) is, for example, made of an electrically insulating material such as a ceramic material. The discharge member (34) closes the hole (16) of the divider (15) separating the first lane (27a) from the second lane (27b). A discharge hole (35) being a small through-hole is cut almost in the center of the discharge member (34). The discharge hole (35) is designed to have, for example, an electrical resistance of several MΩ. This discharge hole (35) defines a path of current to flow between the first electrode (32a) and the second electrode (32b), and a concentrator of the density of current, which increases the density of current in the path of current. When a voltage is applied to the first electrodes (32a) and the second electrodes (32b), an increase in the density of current in the path of current generates the Joule heat to vaporize the water, thereby producing bubbles (C) in the discharge hole (35) of the discharge member (34) (see FIG. 12). Then, the electrodes (32a and 32b) have the same potential as the water, and the interface between each bubble (C) and the water serves as an electrode. This causes dielectric breakdown in the bubble (C) to generate an electric discharge (i.e., a spark discharge). That is, in this discharge, since the first electrodes (32a) and the second electrodes (32b) do not serve as the discharge electrodes, the electrodes (32a and 32b) are less degraded by the discharge.

Second to Sixth Discharge Units

As shown in FIG. 8, each of the second to sixth discharge units (22-26) includes a water vessel (28) and a plurality of discharge sections (30). The second to sixth discharge units (22-26) have almost the same configurations. The second to sixth discharge units (22-26) are vertically arranged such that each of the discharge units (22-26) is horizontally inverted from the upper one of the discharge units (21-25). Each of the second-fifth discharge units (22-25) purifies the water flowing from the upper one of the discharge units (21-24) in the path (27) and allows the water to the lower one of the discharge units (23-26). On the other hand, the sixth discharge unit (26) purifies the water flowing from the upper fifth discharge unit (25) in the path (27), and allows the water to flow out of the outlet pipe (3b) via a reservoir (29) located lower. The second to sixth discharge units (22-26) have almost the same configurations, except that the sixth discharge unit (26) includes, below the outlet (17), the reservoir (29) connected to the outlet pipe (3b). Thus, only the second discharge unit (22) will be described as a representative.

Figure 13:
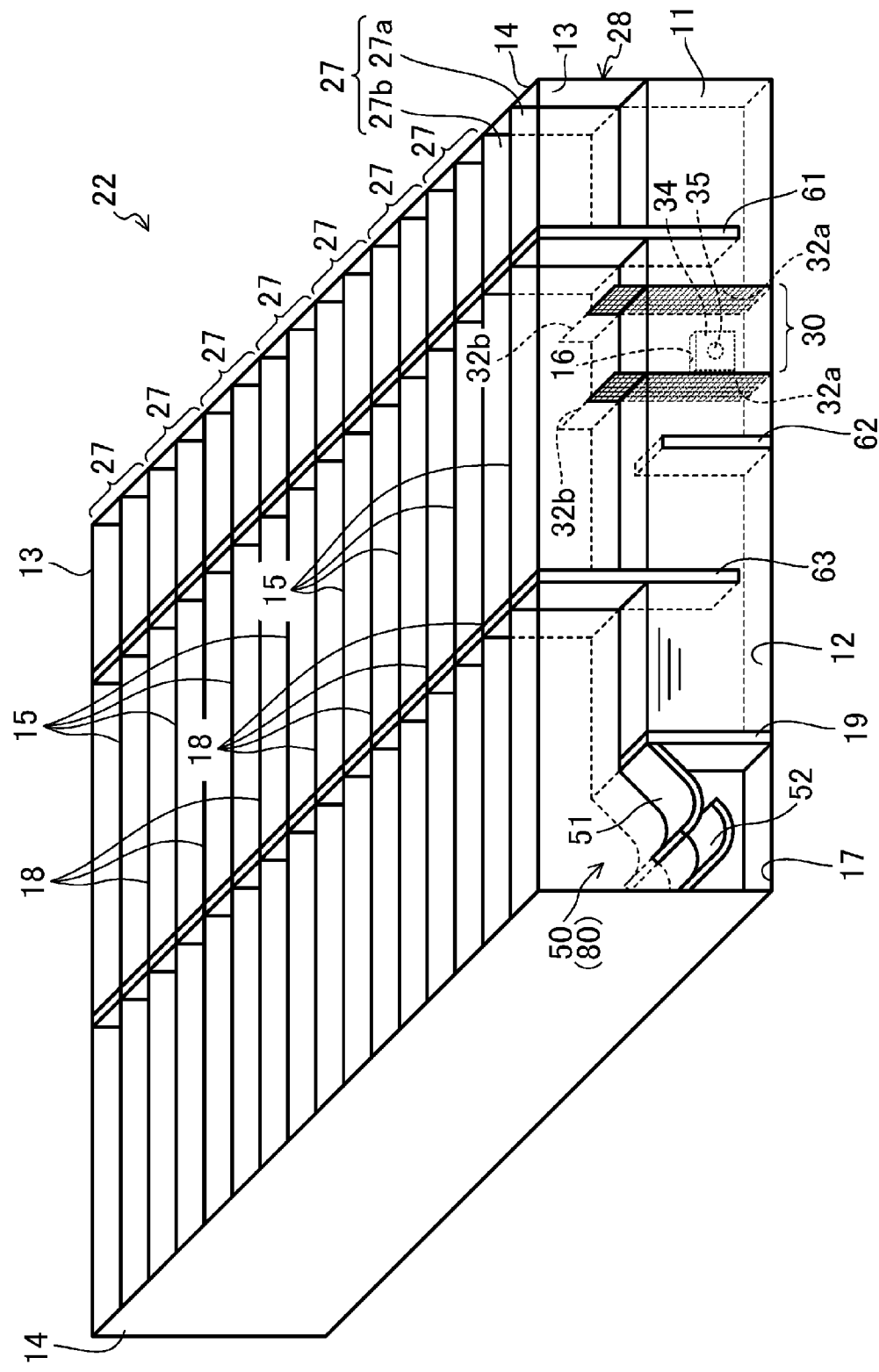
FIG. 13 is a perspective view schematically illustrating a second discharge unit according to the second embodiment.

As shown in FIG. 13, the water vessel (28) includes a bottom (12), two long walls (13 and 13), and two short walls (14 and 14), which are similar to those of the first discharge unit (21). In FIG. 13, the long wall (13) at the front is shown transparently.

As in the first discharge unit (21), seven partitions (18, . . . , 18) are arranged at predetermined intervals inside the water vessel (28) in the width direction of the water vessel (28) to segment the inside of the water vessel (28) into eight paths (27). A divider (15), which has a configuration similar to that in the first discharge unit (21), is located in the middle of each of the eight paths (27) in the width direction of the path. With this structure, in the water vessel (28), the partitions (18, . . . , 18) and the dividers (15, . . . , 15) define 16 lanes (27a, 27b, . . . , 27a, 27b).

Each lane (27a, 27b) includes a dam plate (19) having a configuration similar to that in the first discharge unit (21), and segmenting the lane (27a, 27b) into a treatment vessel (11) located upstream and an outflow section (50) located downstream.

The treatment vessel (11) of the lane (27a, 27b) includes first to third path control plates (61, 62, and 63) in this order from the upstream side to the downstream side between an outlet (17) and the dam plate (19) of the first discharge unit (21) at the upper stage. The first to third path control plates (61, 62, and 63) control the water flow. The first path control plate (61) and the third path control plate (63) are in the same shape as the path control plate (60) of the first discharge unit (21). Specifically, the first path control plate (61) and the third path control plate (63) are flat plates having approximately the same width as the lanes (27a and 27b), and smaller vertical lengths than the short walls (14 and 14). The upper ends of the first path control plate (61) and the third path control plate (63) are located at a position higher than the upper end of the dam plate (19). The lower ends of the first path control plate (61) and the third path control plate (63) are located at a position higher than the bottom (12). On the other hand, the second path control plate (62) has approximately the same width as the lanes (27a and 27b). The second path control plate (62) is a flat plate having a smaller vertical length than the dam plate (19). The lower end of the second path control plate (62) is in contact with the bottom (12).

As in the first discharge unit (21), the outflow section (50) of the lane (27a, 27b) includes the outlet (17), and a first slope (51) and a second slope (52).

Each discharge section (30) has a configuration similar to that in the first discharge unit (21). The discharge section (30) is placed between the first path control plate (61) and the second path control plate (62) in the path (27).

The second discharge unit (22) has the above-described configuration. The third discharge unit (23) has a configuration similar to that of the second discharge unit (22). The third discharge unit (23) is horizontally inverted from the second discharge unit (22), and placed under the second discharge unit (22). The inlet of the first path control plate (61) located upstream of the third discharge unit (23) corresponds to the outlet (17) of the second discharge unit (22). The fourth discharge unit (24) is horizontally inverted from the third discharge unit (23), and placed under the third discharge unit (23). The inlet of the first path control plate (61) located upstream of the fourth discharge unit (24) corresponds to the outlet (17) of the third discharge unit (23). The fifth discharge unit (25) is horizontally inverted from the fourth discharge unit (24), and placed under the fourth discharge unit (24). The inlet of the first path control plate (61) located upstream of the fifth discharge unit (25) corresponds to the outlet (17) of the fourth discharge unit (24). The sixth discharge unit (26) is horizontally inverted from the fifth discharge unit (25), and placed under the fifth discharge unit (25). The inlet of the first path control plate (61) located upstream of the sixth discharge unit (26) corresponds to the outlet (17) of the fifth discharge unit (25).

Figure 14:
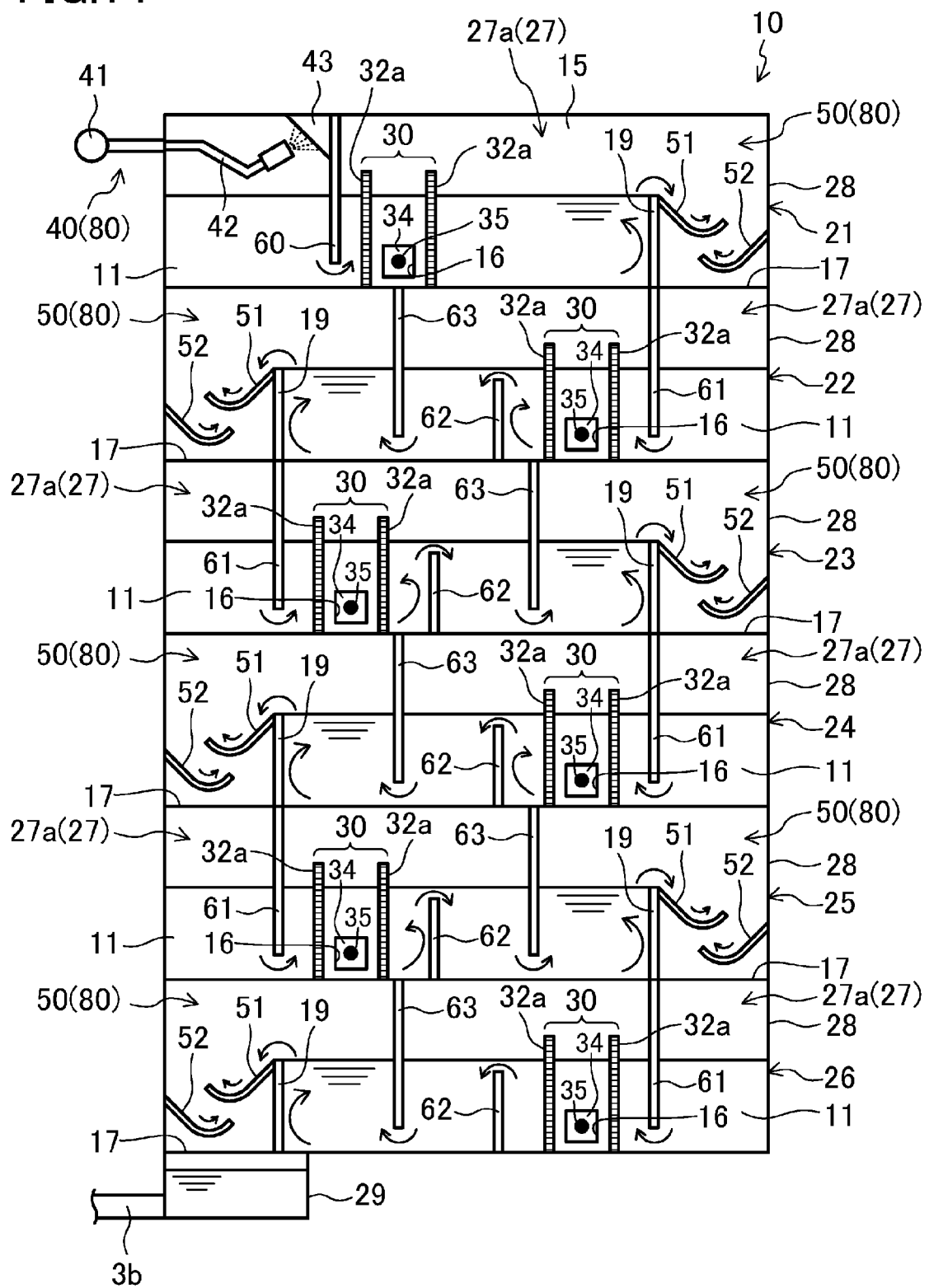
FIG. 14 is a schematical structural view of a discharge unit according to the second embodiment.

With this structure, in the water treatment unit (10), the pump (5a) transfers the water in the water pipe (3) to the first discharge unit (21), which is the uppermost one of the six discharge units (21-26), as shown in FIG. 14. Then, the water sequentially flows in a zigzag from the first discharge unit (21) at the uppermost stage to the sixth discharge unit (26) at the lowermost stage. That is, the water vessels (28) of the first to sixth discharge units (21-26), which are vertically arranged, communicate with each other to allow the water to sequentially flow in a zigzag from the path (27) at an upper stage to the path (27) at the lower stage. Each of the water vessels (28) of the first to sixth discharge units (21-26), which are vertically arranged, includes an insulator (80) at each of the inflow and outflow sides of the associated path (27). The insulator (80) electrically insulates the water flowing to the path (27) from the path (27). Specifically, the spray apparatus (40) serves as the insulator (80) at the inflow side of the first discharge unit (21), while the outflow section (50) serves as the insulator (80) at the outflow side of the first discharge unit (21). At the inflow sides of the second to sixth discharge units (21-26), the outflow sections (50) of the first to fifth discharge units (21-25) at their upper stages serve as the insulators (80). At outflow sides of the second to sixth discharge units (21-26), the outflow sections (50) of the second to sixth discharge units (21-26) serve as the insulators (80).

Operation

In the water treatment system (1a) according to this embodiment, the water treatment unit (10) purifies the water flowing through the water pipe (3).

First, the two pumps (5a and 5b) are driven, and the high-voltage generator (33) applies a voltage with a square wave having the same positive and negative excursions to the pair of electrodes (32a and 32b) of the discharge section (30) of each of the discharge units (21-26). The on-off valves (4 and 4) of the water circulation circuit (1) open before the water treatment unit (10) starts operating.

Once the two pumps (5a and 5b) are driven, the water in the water pipe (3) is transferred to the first discharge unit (21) via the inlet pipe (3a), and the water in the reservoir (29) below the sixth discharge unit (26) is discharged to the water pipe (3) via the outlet pipe (3b).

The water flowing from the water pipe (3) to the inlet pipe (3a) is first, transferred to the spray apparatus (40) of the first discharge unit (21). Specifically, the water in the water pipe (3) flows into the nozzle header (41) via the inlet pipe (3a), and then sprayed obliquely upward in each lane (27a, 27b) of the paths (27) from the spray nozzle (42). The water sprayed from the spray nozzle (42) hits the reflector (43) to be reflected, and falls down to the water contained in the treatment vessel (11).

The water sprayed from the spray nozzle (42) is drops (or droplets), thereby interposing the air between the drops (or the droplets) to increase the electrical resistance between the water in the inlet pipe (3a) of the water pipe (3) and the water in the treatment vessel (11). In this embodiment, the electrical resistance between the water in the inlet pipe (3a) of the water pipe (3) and the water in the treatment vessel (11) is hundreds of MΩ or more. This electrically insulates the water flowing from the inlet pipe (3a) of the water pipe (3) from the water flowing through the treatment vessel (11). That is, the spray apparatus (40) is the insulator (80) according to the present invention.

In this embodiment, the water is sprayed obliquely upward from the spray nozzles (42). As compared to the case where the water is sprayed downward, the water path from each spray nozzle (42) to the surface of the water in the treatment vessel (11) is long, thereby increasing the electrical resistance between the spray nozzle (42) and the treatment vessel (11). This results in an improvement in the insulation characteristics of the spray apparatus (40) serving as the insulator (80).

The water sprayed from the spray nozzle (42) is fined when hitting the reflector (43). As compared to the case without the reflector (43), the drops (or the droplets) fall down to the treatment vessel (11) at long intervals, thereby increasing the electrical resistance between the spray nozzles (42) and the treatment vessel (11). That is, the reflector (43) is a fining means fining the drops falling down from the spray nozzle (42) to the treatment vessel (11). This fining means also improves the insulation characteristics of the spray apparatus (40) serving as the insulator (80).

The water sprayed from the spray nozzle (42) and flowing into the treatment vessel (11) passes through the gap between the path control plate (60) and bottom (12) and flows downstream. The flow rate of the water increases when the water passes through the gap, and the water energetically passes through the two mesh electrodes (32a, 32a) and (32b, 32b).

Figure 12:
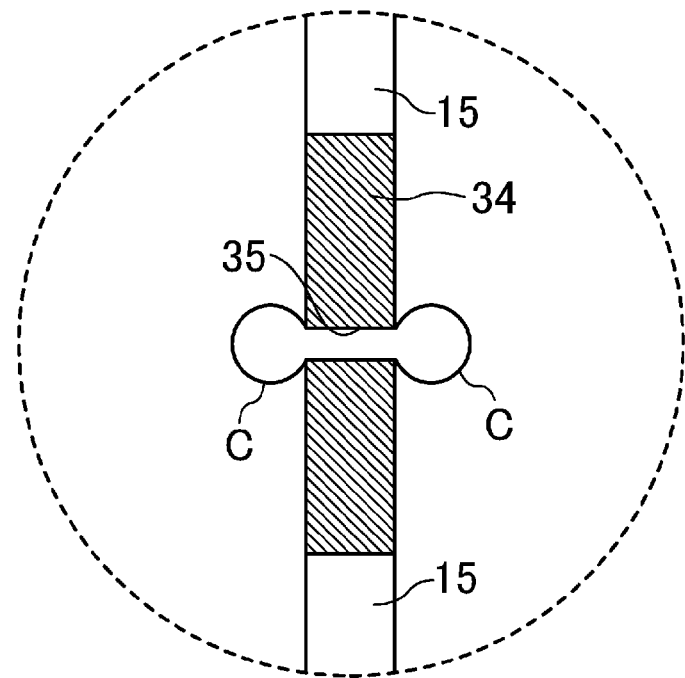
FIG. 12 is a partial enlarged view of the discharge section according to the second embodiment.

On the other hand, the high-voltage generator (33) applies to the pair of electrodes (32a and 32b) of each discharge section (30), a voltage with a square wave having the same positive and negative excursions. This increases the density of current in the path of current of the discharge hole (35) of the discharge member (34) between the two treatment vessels (11) of each path (27) (i.e., the treatment vessel (11) of the first lane (27a) and the treatment vessel (11) of the second lane (27b)). With an increase in the density of current in the path of current of the discharge hole (35), the Joule heat inside the discharge hole (35) increases. Then, the vaporization of the water progresses to produce the bubbles (C) in the vapor phase inside and near the inlet and the outlet of the discharge hole (35). As shown in FIG. 12, each bubble (C) entirely covers the end of the discharge hole (23). In this state, the bubbles (C) function as the resistor hindering the electrical conduction between the first electrode (32a) and the second electrode (32b) via the water. Then, the electrodes (32a and 32b) and the water have the same potential, and the interface between each bubble (C) and the water serves as an electrode. This causes dielectric breakdown inside the bubble (C) at the interface between the bubble (C) and the water to generate an electric discharge.

As described above, when an electric discharge is generated in the bubble (C), bactericidal factors (e.g., hydroxyl radical) are produced in the water in the treatment vessel (11).

As described above, in each treatment vessel (11), the water passes through the gap between the path control plate (60) and the bottom (12) and flows downstream. When the water passes through the gap, the flow rate of the water increases so that the water hits the dam plate (19). Part of the water, which has hit the dam plate (19), is splashed back against the dam plate (19) to generate a swirl. On the other hand, the rest of the water flows over the dam plate (19) into the outflow section (50). As such, in the treatment vessel (11), the path control plate (60) increases the flow rate of the water to generate the swirl, thereby stirring the water. That is, the path control plate (60) serves as the stir member of the present invention. Such a stir member stirring the water in the treatment vessel (11) diffuses the bactericidal factors produced in the water of the treatment vessel (11) to promote the purification.

The water purified in each treatment vessel (11) flows over the treatment vessel (11) into the outflow section (50). The water, which has flown into the outflow section (50), flows obliquely downward along the first slope (51), and splashes obliquely upward at the curve to be fine drops (or droplets) and hits the short wall (14). The hit of the water with the short wall (14) changes the direction of the water horizontally (horizontally in FIG. 9) and allows the water to flow down along the second slope (52). The water is further fined when splashing obliquely upward at the curve. The splashed water hits the dam plate (19), falls down, and passes through the outlet (17) to flow into the treatment vessels (11) of the second discharge unit (22).

As such, the water, which has flown over the treatment vessel (11), becomes drops (or droplets) in the outflow section (50) and falls down to the second discharge unit (22) at the lower stage. Then, the air interposed between the drops (or the droplets) increases the electrical resistance between the treatment vessel (11) and the second discharge unit (22). In this embodiment, the electrical resistance in each outflow section (50) is hundreds of MΩ or more. This electrically insulates the treatment vessel (11) from the second discharge unit (22). That is, each outflow section (50) serves as the insulator according to the present invention (80).

In this embodiment, the water, which has flown over the treatment vessel (11), is splashed by the first and second slopes (51 and 52). As compared to the case where the water simply falls down without passing through the first and second slopes (51 and 52), the water becomes fine drops (or droplets). As a result, as compared to the case without the first and second slopes (51 and 52), the drops (or the droplets) fall down at long intervals between the treatment vessel (11) and the second discharge unit (22), thereby increasing the electrical resistance between the treatment vessel (11) and the second discharge unit (22). That is, the first and second slopes (51 and 52) serve as fining means, which fines the drops falling down from the treatment vessel (11) to second discharge unit (22) at the lower stage. These fining means also improve the insulation characteristics of the outflow section (50), which serves as the insulator (80).

The water flowing into the treatment vessel (11) of the second discharge unit (22) meanders due to the three path control plates (61-63) in the treatment vessel (11) and flows to the dam plate (19). Specifically, as shown in FIGS. 15-17, the water flowing into the treatment vessel (11), first, passes through the gap between the first path control plate (61) and the bottom (12), and flows downstream. When the water passes through the gap, the flow rate of the water increases so that the water energetically passes through the two mesh electrodes (32a, 32a) and (32b, 32b), and hits the second path control plate (62). Part of the water, which has hit the second path control plate (62), is splashed back against the second path control plate (62) to generate a swirl. On the other hand, the rest of the water flows over the second path control plate (62) and flows downstream. The water flowing over the second path control plate (62) hits the third path control plate (63). Part of the water, which has hit the third path control plate (63), is splashed back against the third path control plate (63) to generate a swirl. On the other hand, the rest of the water passes through the gap between the third path control plate (63) and bottom (12), and flows downstream. When the water passes through the gap, the flow rate of the water increases so that the water hits the dam plate (19). Part of the water, which has hit the dam plate (19), is splashed back against the dam plate (19) to generate a swirl. On the other hand, the rest of the water flows over the dam plate (19) into the outflow section (50). As such, in each treatment vessel (11), each of the first to third path control plates (61-63) allows the water flow to meander, and increases the flow rate of the water to generate the swirl, thereby stirring the water. That is, the first to third path control plates (61-63) serve as the stir members according to the present invention.

In the treatment vessel (11) of the second discharge unit (22), a discharge is generated between the first path control plate (61) and the second path control plate (62) to produce bactericidal factors as in the first discharge unit (21). The produced bactericidal factors are diffused by stirring the water using the stir member in each treatment vessel (11), thereby promoting the purification of the water in the second discharge unit (22).

The water purified in the treatment vessel (11) of the second discharge unit (22) flows over the treatment vessel (11) into the outflow section (50). In the second discharge unit (22) as well, the water, which has flown over the treatment vessel (11), become drops (i.e., droplets) in the outflow section (50) and fall down to the third discharge unit (23) at the lower stage. This increases the electrical resistance between the treatment vessel (11) of the second discharge unit (22) and the treatment vessel (11) of the third discharge unit (23) at the lower stage, thereby electrically insulating the treatment vessel (11) of the second discharge unit (22) from the treatment vessel (11) of the third discharge unit (23). In the second discharge unit (22) as well, the water, which has flown over the treatment vessel (11), is splashed by the first and second slopes (51 and 52). Thus, as compared to the case where the water simply falls down without passing through the first and second slopes (51 and 52), fine drops (or droplets) are formed. Therefore, as compared to the case without the first and second slopes (51 and 52), the insulation characteristics of the outflow section (50) serving as an insulator (80) improves.

Subsequently, water flows through the third to sixth discharge units (23-26) to be purified as in the second discharge unit (22). The water, which has fallen down to the reservoir (29) below the outflow section (50) of the sixth discharge unit (26), is discharged to the water pipe (3) by the outflow water pump (5b) via the outlet pipe (3b).

As described above, in the water treatment unit (10), the water flows in a zigzag through the six vertically arranged discharge units (21-26), from the paths (27) of the first discharge unit (21) at the uppermost stage to the paths (27) of the sixth discharge unit (26) at the lowermost stage. At this time, the discharge section (30) generates the discharge in each path (27) at each stage to produce the bactericidal factors.

Advantages of Second Embodiment

In this embodiment, the water treatment unit (10) includes the plurality of water vessels (28) and the discharge section (30). The water vessels (28) are vertically arranged, each of which has the segmented paths (27). The discharge section (30) generates the discharge to produce the bactericidal factors in the water in the paths (27). The plurality of water vessels (28) communicate with each other to allow the water to sequentially flow in a zigzag from the uppermost stage to the lowermost stage. On the other hand, the insulators (80) are provided at the inflow sides and the outflow sides of the paths (27). This ensures a long water path in the water treatment unit (10), and reduces the planer size of the water treatment unit (10). That is, a long contact time between the bactericidal factors and the water is obtained, thereby reducing the degradation in sterilization performance. Also, since the planer size decreases, the installation area also decreases.

In this embodiment, the water falls as drops (or droplets) between each path (27) of the discharge units (21-26) and the water flowing to the path (27), thereby interposing the air between the drops (or the droplets) of the water. This increases the electrical resistance between the path (27) of the discharge units (21-26) and the water flowing through the path (27) to facilitate the electrical insulation. As a result, the discharge is reliably generated in the water in the water treatment unit (10). This allows efficient use of the applied electric power.

In this embodiment, since each water vessel (28) includes the plurality of path (27), the amount of the water treated by the water treatment system can be controlled in accordance with the number of the paths (27).

In this embodiment, in the discharge hole (35) in the insulating divider (15) separating the pair of electrodes (32a and 32b), the density of current increases, thereby producing the bubbles (C) to generate an electric discharge in the bubbles (C). Accordingly, the discharge electrodes are formed at the interface between each bubble (C) and the water. That is, in this discharge, since the first electrodes (32a) and the second electrodes (32b) do not serve as discharge electrodes, the electrodes (32a and 32b) are less degraded by the discharge.

In this embodiment, since the high-voltage generator (33) is of the alternating type, the voltage applied to the pair of electrodes (32a and 32b) alternates between the positive and negative values at regular intervals. A spark discharge is generated in the discharge hole (35) with no glow discharge generated. That is, in the case of the DC current, the form of the discharge changes from the spark discharge to a glow discharge with an increase in the current. In this embodiment, since the polarity of the voltage applied to the pair of electrodes (32a and 32b) alternates from positive to negative, or vice versa, before the form of the discharge changes to the glow discharge, the spark discharge is continuously generated in the discharge hole (35) with no glow discharge generated. This prevents thermal destruction in the discharge hole (35), which is caused by a glow discharge, to reduce an increase in the size of the discharge hole (35). This results in a highly stabilized discharge.

In this embodiment, since the waveform of the voltage has the same positive and negative excursions, each electrode (32a, 32b) causes oxidation reaction and reduction reaction uniformly. This reduces elution of metal from the pair of electrodes (32a and 32b) due to the oxidation reaction. The alternating waveform of the voltage generated by the high-voltage generator (33) reduces deposition of metal, etc., from the electrode (31, 32). This results in a highly stabilized discharge.

In this embodiment, since the waveform of the voltage is a square wave, an electric discharge is generated without depending on the conductivity of the water unlike a sine wave, for example. This results in a highly stabilized discharge.

In this embodiment, each treatment vessel (11) includes the path control plates (60, 61, 62, and 63), which serve as the stir members stirring the water in the treatment vessel (11). This uniformly diffuses in the water in the treatment vessel (11), the bactericidal factors produced in the water in the treatment vessel (11).

In this embodiment, the water vessels (28) with the same shape are stacked from bottom to top in alternately horizontally inverted arrangement, thereby readily forming the water treatment unit (10).

In this embodiment, being horizontally slidable, the water vessels (28) are readily attached and detached in maintenance, etc.

In this embodiment, where the water tank (2) is a hot water tank storing hot water, and the water circulation circuit (1) is a hot water circulation circuit circulating the hot water in the hot water tank, the water pipe (3) serves as a circulation pipe circulating the hot water in the hot water tank (2). That is, in this case, the water treatment unit (10) is connected to an intermediate portion of the circulation pipe, which circulates the hot water in the hot water tank (2).

The hot water stored in the hot water tank (2) and to be supplied needs to be kept at a high temperature to prevent the growth of bacteria. Accordingly, hot water at an unnecessarily high temperature has been supplied to the application side, thereby increasing the running costs.

In the above-described case, however, the water treatment unit (10) is connected to the intermediate portion of the circulation pipe, which is connected to the hot water tank (2) storing the hot water to be supplied to circulate the hot water in the hot water tank (2). Thus, the hot water purified by the bactericidal factors in the water treatment unit (10) returns to the hot water tank (2), thereby reducing the growth of the bacteria in the hot water tank (2). There is thus no need to keep the hot water tank (2) at a high temperature, thereby preventing the supply of the hot water at the unnecessarily high temperature to the application side. This reduces the running costs.

Third Embodiment of Invention

In a third embodiment, the stir members (i.e., the path control plates (60-63) in the second embodiment) in each treatment vessel (11) of the discharge units (21-26) of the second embodiment have a modified configuration.

Figure 18:
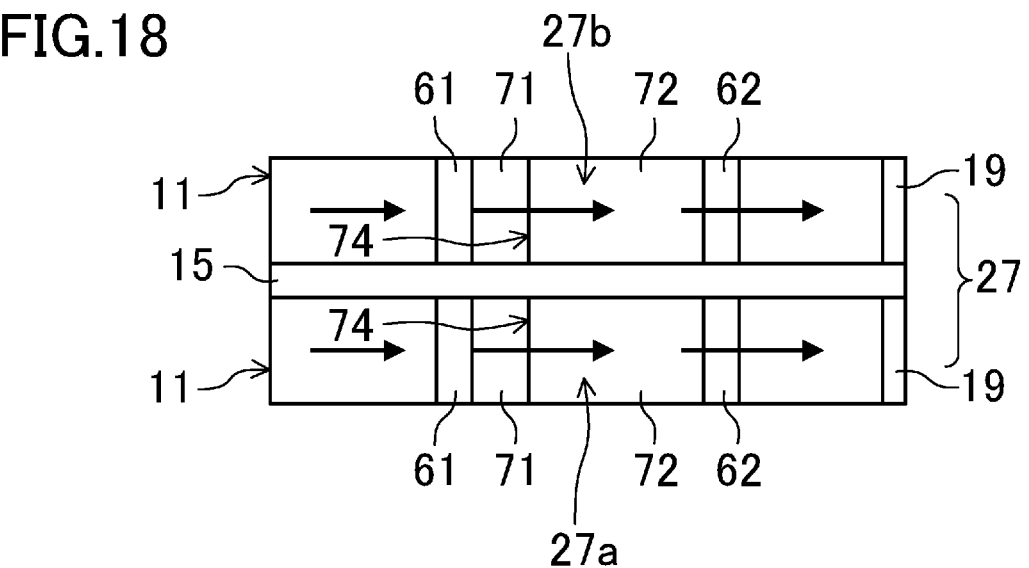
FIG. 18 is a top view schematically illustrating a treatment vessel of a second discharge unit according to a third embodiment.
Figure 19:
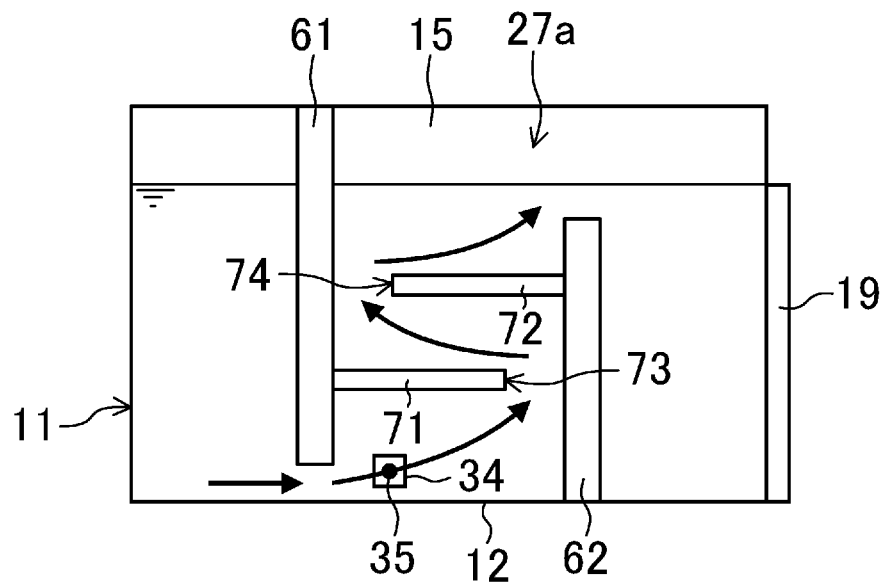
FIG. 19 is a side view schematically illustrating the treatment vessel of the second discharge unit according to the third embodiment.

Specifically, in the third embodiment, as shown in FIGS. 18 and 19, each treatment vessel (11) of the discharge units (21-26) includes the first and second path control plates (61 and 62) as in the second embodiment. In addition, the treatment vessel (11) includes a lower path control plate (71) and an upper path control plate (72) from bottom to top between the path control plates (61 and 62). The lower path control plate (71) and the upper path control plate (72) are flat plates parallel to the bottom (12). The horizontal lengths of the lower path control plate (71) and the upper path control plate (72) are shorter than the distance between the first and second path control plates (61 and 62). The front-back lengths of the lower path control plate (71) and the upper path control plate (72) are equal to the width of each treatment vessel (11). One end of the lower path control plate (71) is in contact with the first path control plate (61), while a gap is formed between the other end and the second path control plate (62). On the other hand, one end of the upper path control plate (72) is in contact with the second path control plate (62), while a gap is formed between the other end and the first path control plate (61). Although not shown, the lower path control plate (71) and the upper path control plate (72) are placed out of the electrodes (32a and 32b), for example, by forming a hole penetrated by the electrode (32a, 32b).

These four path control plates (61, 62, 71, and 72) allow the water flowing into the treatment vessel (11), to flow from the gap between the first path control plate (61) and the bottom (12) to the region between the first path control plate (61) and the second path control plate (62). When the water flows upward in the region, the flow meanders. Specifically, as shown in FIG. 19, the water, which has flown between the first path control plate (61) and the second path control plate (62), flows below the lower path control plate (71) toward the outflow side of the treatment vessel (11) to hit the associated second path control plate (62). The circulation direction of the water, which has hit the second path control plate (62), is inverted such that the water flows between the lower path control plate (71) and the upper path control plate (72) toward the inflow side of the treatment vessel (11). The water then hits the first path control plate (61). The circulation direction of the water, which has hit the first path control plate (61), is inverted the water flows above the upper path control plate (72) toward the outflow side of the treatment vessel (11).

As such, the water flow meanders in the region between the first path control plate (61) and the second path control plate (62), thereby extending the water circulation path in the treatment vessel (11). The water flow hits the first path control plate (61) and second path control plate (62), thereby generating a swirl. With this configuration, in the third embodiment as well, the four path control plates (61, 62, 71, and 72) stir the water in the treatment vessel (11). That is, the four path control plates (61, 62, 71, and 72) serve as the stir members according to the present invention. Such stir members also uniformly diffuse, in the water in each treatment vessel (11), the bactericidal factors produced in the water of the treatment vessel (11) to promote the purification.

Fourth Embodiment of Invention

In a fourth embodiment, the stir members (i.e., the path control plates (60-63) in the second embodiment) in each treatment vessel (11) of the discharge units (21-26) of the second embodiment have a modified configuration.

Specifically, in the fourth embodiment, as shown in FIGS. 20-23, each treatment vessel (11) of the discharge units (21-26) includes a first path control plate (61) and a second path control plate (62) as in the second embodiment. In the fourth embodiment, no gap is formed between the first path control plate (61) and the bottom (12). The vertical length of the second path control plate (62) is greater than that of the dam plate (19). An inlet (61a) is formed at the lower end and one width end of the first path control plate (61). On the other hand, an outlet (62a) is formed at the same height as the upper end of the dam plate (19) of the second path control plate (62) and at the width end opposite to the inlet (61a).

Between the first and second path control plates (61 and 62), an inner path control plate (81) and an outer path control plate (82) are sequentially arranged from the divider (15) side to a partition (18) side. The inner and outer path control plates (81 and 82) are flat plates parallel to the divider (15). The vertical lengths of the inner and outer path control plates (81 and 82) are greater than that of the dam plate (19), and equal to that of the short wall (14) at the inflow side. The horizontal lengths of the inner and outer path control plates (81 and 82) are smaller than the distance between the first and second path control plates (61 and 62). One end of the inner path control plate (81) is in contact with the first path control plate (61), while a gap is formed between the other end of the inner path control plate (81) and the second path control plate (62). On the other hand, one end of the outer path control plate (82) is in contact with the second path control plate (62), while a gap is formed between the other end of the outer path control plate (82) and the first path control plate (61). Although not shown, the inner path control plate (81) and the outer path control plate (82) are placed out of the electrodes (32a and 32b), for example, by forming a hole penetrated by the electrode (32a, 32b).

Figure 20:
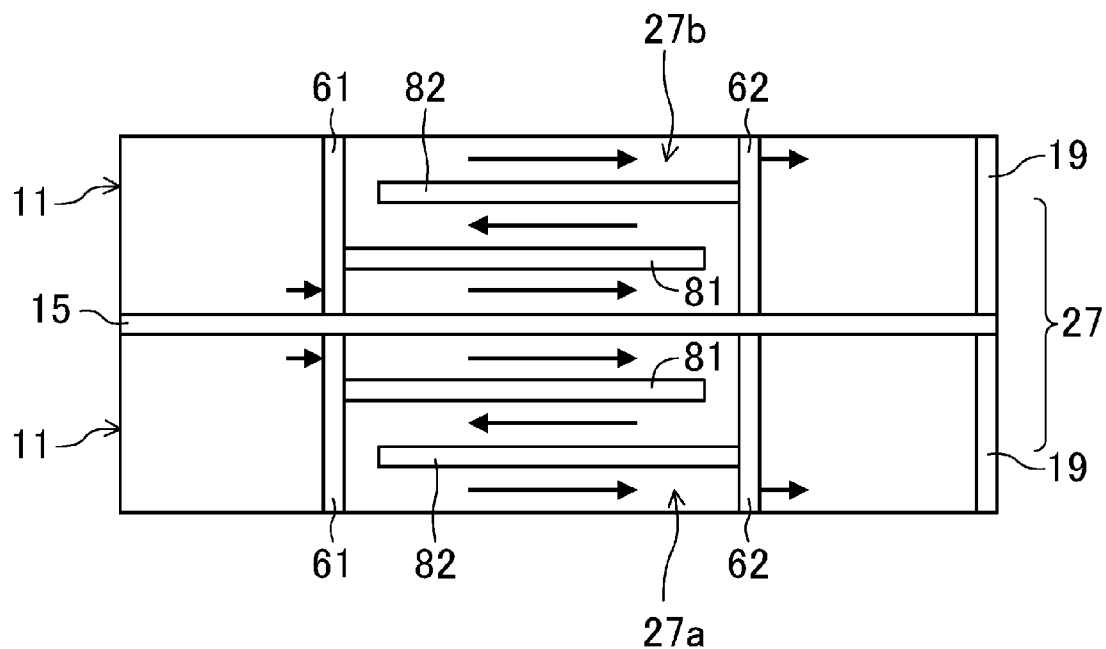
FIG. 20 is a top view schematically illustrating a treatment vessel of a second discharge unit according to a fourth embodiment.
Figure 21:
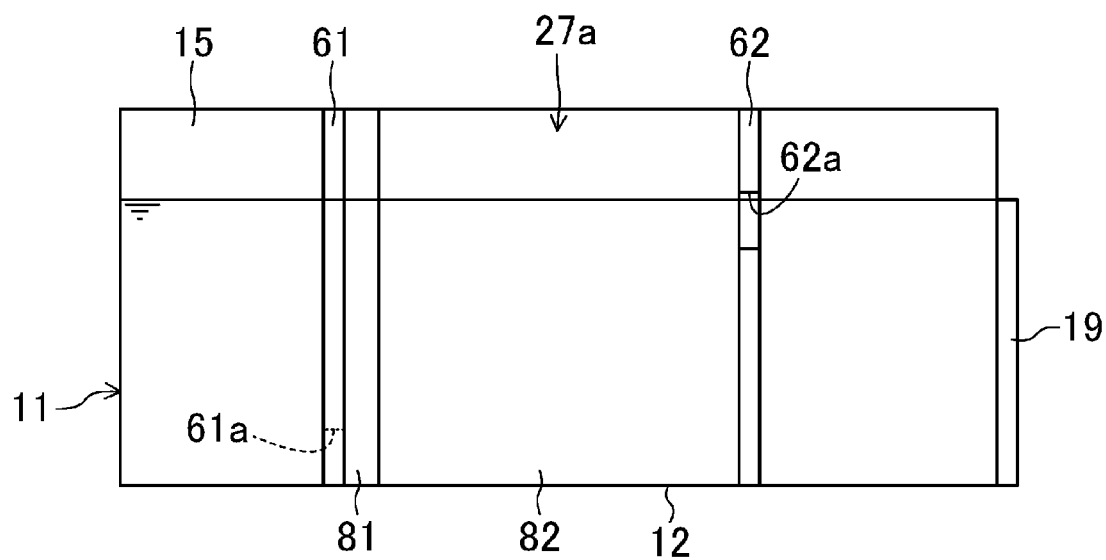
FIG. 21 is a side view schematically illustrating the treatment vessel of the second discharge unit according to the fourth embodiment.
Figure 22:
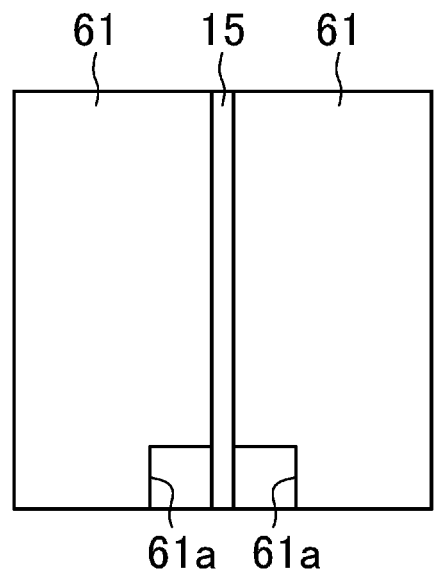
FIG. 22 is a front view schematically illustrating a first path control plate according to the fourth embodiment.
Figure 23:
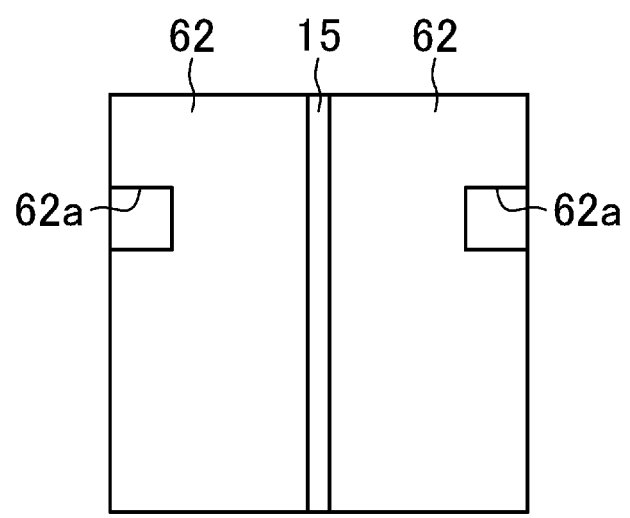
FIG. 23 is a back view schematically illustrating a second path control plate according to the fourth embodiment.

These four path control plates (61, 62, 81, and 82) allow the water flowing into the treatment vessel (11), to flow from the inlet (61a) of the first path control plate (61) to the region between the first path control plate (61) and the second path control plate (62). When the water flows from the divider (15) side to a partition (18) side in the region, the flow meanders. Specifically, as shown in FIG. 20, the water, which has flown between the first path control plate (61) and the second path control plate (62), flows between the inner path control plate (81) and the divider (15) toward the outflow side of the treatment vessel (11) to hit the second path control plate (62). The circulation direction of the water, has hit the second path control plate (62), is inverted such that the water flows between the outer path control plate (82) and the inner path control plate (81) toward the inflow side of the treatment vessel (11). Then, the water hits the first path control plate (61). The circulation direction of the water, which has hit the first path control plate (61), is inverted such that the water flows between the outer path control plate (82) and the partition (18) toward the outflow side of the treatment vessel (11). The water flows then downstream from the outlet (62a) of the second path control plate (62).

As such, the water flow meanders in the region between the first path control plate (61) and the second path control plate (62), thereby extending the water circulation path in the treatment vessel (11). The water flow hits the first path control plate (61) and second path control plate (62), thereby generating a swirl. With this configuration, in the fourth embodiment as well, the four path control plates (61, 62, 81, and 82) stir the water in the treatment vessel (11). That is, the four path control plates (61, 62, 81, and 82) serve as the stir members according to the present invention. Such stir members also uniformly diffuse, in the water in each treatment vessel (11), the bactericidal factors produced in the water of the treatment vessel (11) to promote the purification.

Fifth Embodiment of Invention

In a fifth embodiment, the stir members (i.e., the path control plates (60-63) in the second embodiment) in each treatment vessel (11) of the discharge units (21-26) of the second embodiment have a modified configuration.

Figure 24:
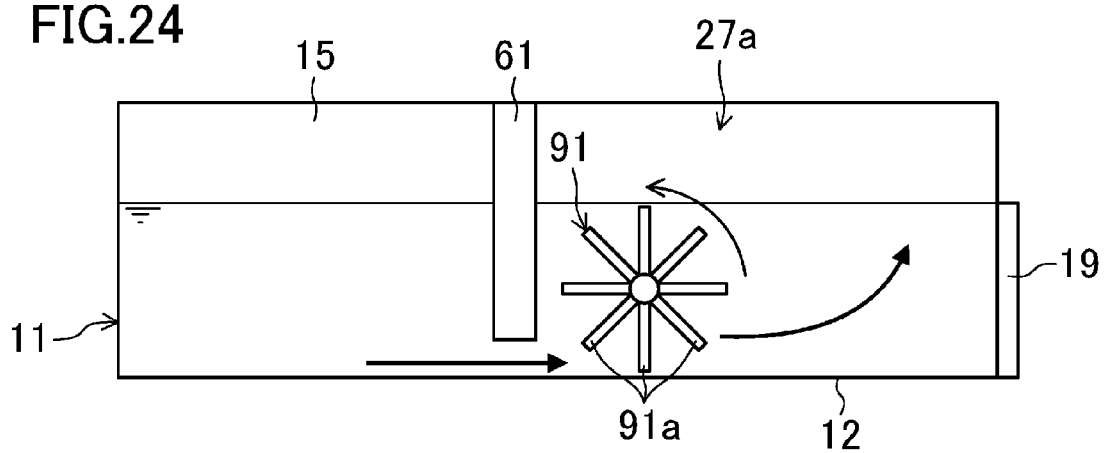
FIG. 24 is a side view schematically illustrating a water treatment unit according to a fifth embodiment.

As shown in FIG. 24, in the fifth embodiment, each treatment vessel (11) of the discharge units (21-26) includes a first path control plate (61) as in the second embodiment, and a water wheel (91) with a plurality of blades (91a). The water wheel (91) is located immediately downstream of the first path control plate (61). The rotation axis extends along the width of the treatment vessel (11).

The water flowing into the treatment vessel (11) passes through the gap between the first path control plate (61) and the bottom (12), and flows downstream. When the water passes through the gap, the flow rate of the water increases so that the water hits the blades (91a) of the water wheel (91), thereby rotating the water wheel (91). The rotation stirs the water in the treatment vessel (11).

As such, in the fifth embodiment as well, the first path control plate (61) and the water wheel (91) stir the water in the treatment vessel (11). That is, the first path control plate (61) and the water wheel (91) serve as the stir members according to the present invention. Such stir members also uniformly diffuse, in the water in each treatment vessel (11), the bactericidal factors produced in the water of the treatment vessel (11) to promote the purification.

Sixth Embodiment of Invention

In a sixth embodiment, the stir member (i.e., the path control plates (60-63) in the second embodiment) in each treatment vessel (11) of the discharge units (21-26) of the second embodiment has a modified configuration.

Figure 25:
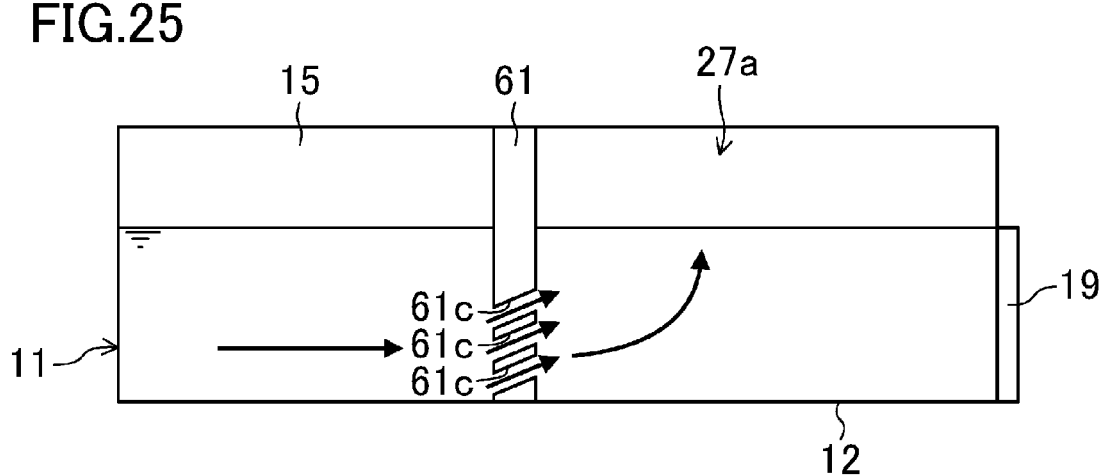
FIG. 25 is a side view schematically illustrating a water treatment unit according to a sixth embodiment.

As shown in FIG. 25, in the sixth embodiment, each treatment vessel (11) of the discharge units (21-26) includes a first path control plate (61) as in the second embodiment. In the sixth embodiment, no gap is formed between the first path control plate (61) and the bottom (12). A plurality (three in this embodiment) of slits (61c) are cut at the lower end of the first path control plate (61). The slits (61c) are gradually inclined upward from the inflow side toward the outflow side of the treatment vessel (11).

The water flowing into the treatment vessel (11) passes through the plurality of slits (61c) of the first path control plate (61), and flows downstream. The water passes through the slits (61c) to flow obliquely upward, thereby generating a swirl. When the water passes through the slits (61c), the flow rate rises to hit the dam plate (19). Part of the water, which has hit the dam plate (19), is splashed back against the dam plate (19) to generate a swirl. On the other hand, the rest of the water flows over the dam plate (19) into the outflow section (50).

As such, in the sixth embodiment as well, the first path control plate (61) with the plurality of slits (61c) stirs the water in the treatment vessel (11). That is, the first path control plate (61) with the plurality of slits (61c) serves as the stir member according to the present invention. Such a stir member also uniformly diffuses, in the water in each treatment vessel (11), the bactericidal factors produced in the water of the treatment vessel (11) to promote the purification.

Seventh Embodiment of Invention

In a seventh embodiment, the stir members (i.e., the path control plates (60-63) in the second embodiment) in each treatment vessel (11) of the discharge units (21-26) of the second embodiment have a modified configuration.

Figure 26:
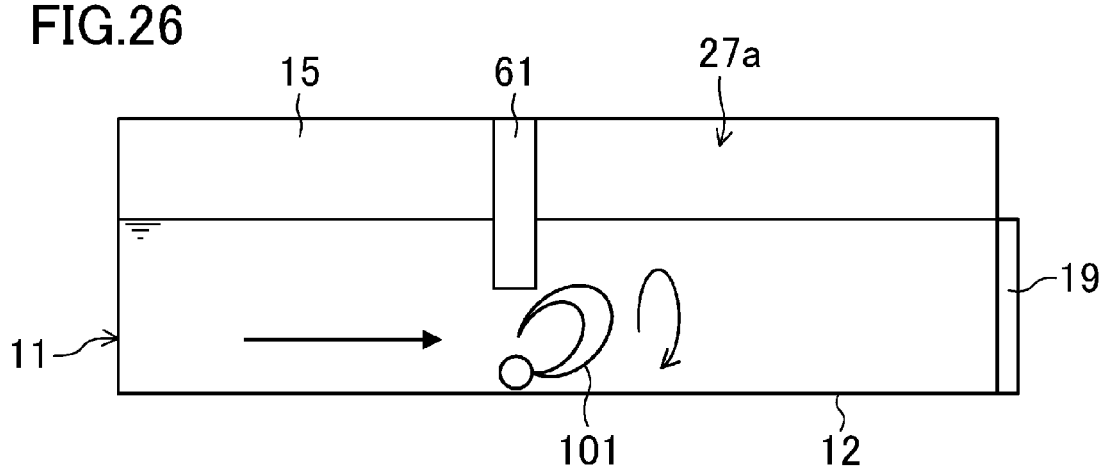
FIG. 26 is a side view schematically illustrating a water treatment unit according to a seventh embodiment.

As shown in FIG. 26, the seventh embodiment, each treatment vessel (11) of the discharge units (21-26) includes a first path control plate (61) as in the second embodiment, and a rotation member (101) rotated by water flow. The rotation member (101) is located immediately downstream of the first path control plate (61), and formed in a spiral shape or like a fish tail of a fishing tool (only the spiral shape is shown in FIG. 26).

The water flowing into the treatment vessel (11) passes through the gap between the first path control plate (61) and the bottom (12), and flows downstream. When the water passes through the gap, the flow rate rises to hit the rotation member (101), thereby rotating the rotation member (101). This stirs the water in the treatment vessel (11).

As such, in the seventh embodiment as well, the first path control plate (61) and the rotation member (101) stir the water in the treatment vessel (11). That is, the first path control plate (61) and the rotation member (101) serve as the stir members according to the present invention. Such stir members also uniformly diffuse, in the water in each treatment vessel (11), the bactericidal factors produced in the water of the treatment vessel (11) to promote the purification.

The rotation member (101) may have any configuration besides what is described above, as long as it is rotated by water flow around a rotation axis.

Eighth Embodiment of Invention

In an eighth embodiment, the stir members (i.e., the path control plates (60-63) in the second embodiment) in each treatment vessel (11) of the discharge units (21-26) of the second embodiment have a modified configuration.

Figure 27:
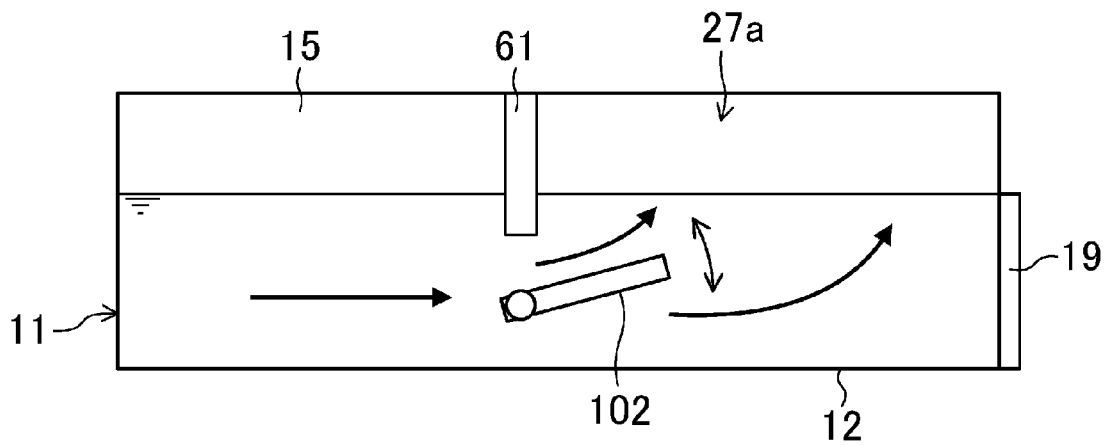
FIG. 27 is a side view schematically illustrating a water treatment unit according to an eighth embodiment.

As shown in FIG. 27, in the eighth embodiment, each treatment vessel (11) of the discharge units (21-26) includes a first path control plate (61) as in the second embodiment. In the eighth embodiment, however, a gap larger than that of the second embodiment is formed between the first path control plate (61) and the bottom (12). An electrically driven louver (102), which turns up and down, is provided in the gap between the first path control plate (61) and the bottom (12).

When the water flowing into the treatment vessel (11) passes through the gap between the first path control plate (61) and the bottom (12), the flow rate rises and the louver (102) deflects the flow in the direction in which the louver (102) extends. Since the louver (102) turning up and down, the direction of the water flowing downstream from the gap between the first path control plate (61) and the bottom (12) changes in accordance with the turn of the louver (102), thereby stirring the water in the treatment vessel (11).

As such, in the eighth embodiment as well, the first path control plate (61) and the louver (102) stir the water in the treatment vessel (11). That is, the first path control plate (61) and the louver (102) serve as the stir members according to the present invention. Such stir members also uniformly diffuse, in the water in each treatment vessel (11), the bactericidal factors produced in the water of the treatment vessel (11) to promote the purification.

Ninth Embodiment of Invention

In a ninth embodiment, the stir member (i.e., the path control plates (60-63) in the second embodiment) in each treatment vessel (11) of the discharge units (21-26) of the second embodiment have a modified configuration.

Figure 28:
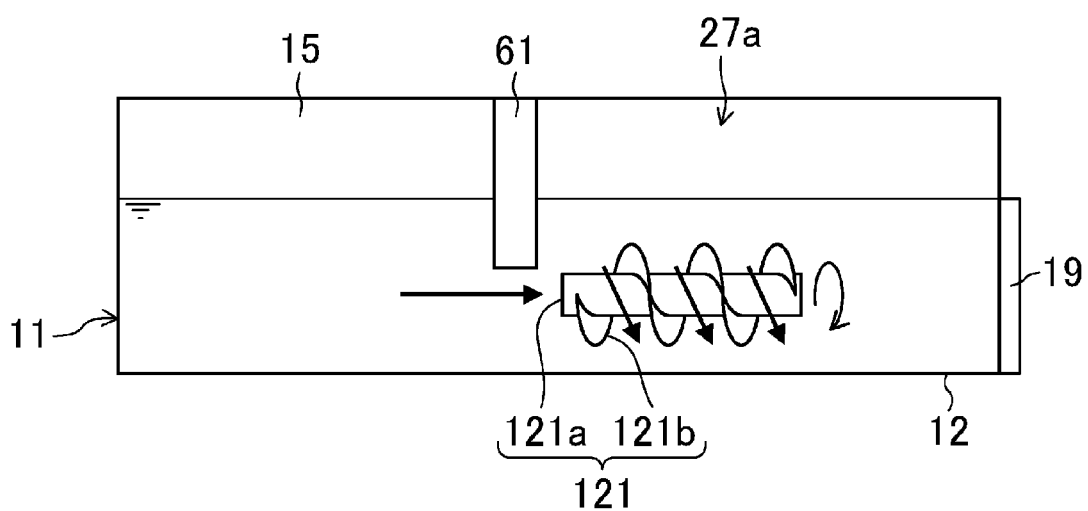
FIG. 28 is a side view schematically illustrating a water treatment unit according to a ninth embodiment.

As shown in FIG. 28, in the ninth embodiment, each treatment vessel (11) of the discharge units (21-26) does not include any path control plate as in the second embodiment. Each vessel (11) includes an electrically driven screw rotor (121) with a shaft (121*a*) and spiral blades (121*b*). The water flowing into the treatment vessel (11) is stirred by the rotation of the screw rotor (121). That is, in the ninth embodiment, the screw rotor (121) serves as the stir member according to the present invention. Such a stir member also uniformly diffuses, in the water in each treatment vessel (11), the bactericidal factors produced in the water of the treatment vessel (11) to promote the purification.

Tenth Embodiment of Invention

In the tenth embodiment, the spray apparatus (40) of the second embodiment, which serves as the inflow-side insulator (80) of the first discharge unit (21), has a modified configuration. Specifically, in the tenth embodiment, the spray apparatus (40) does not include any reflector (43). The set angle of each spray nozzle (42) is different from that in the second embodiment.

Figure 29:
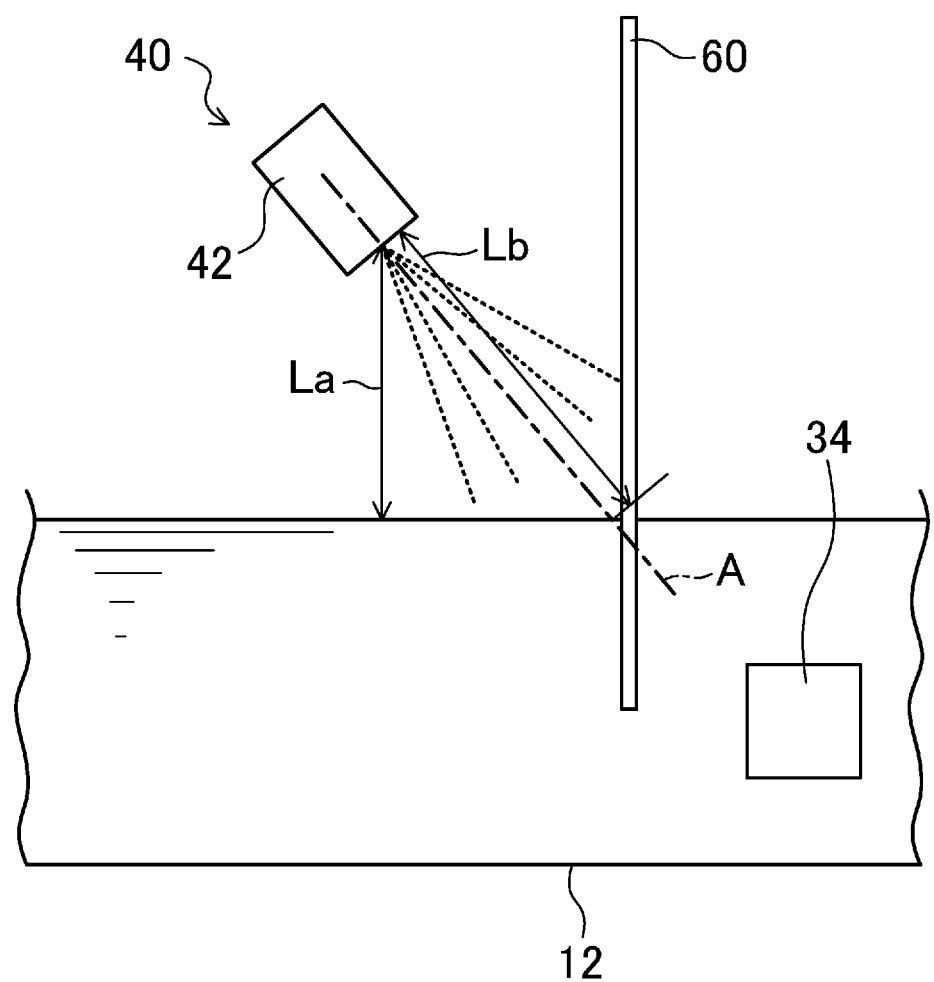
FIG. 29 is a schematic view illustrating the periphery of a spray nozzle according to a tenth embodiment.

As shown in FIG. 29, each spray nozzle (42) sprays the water from the water pipe (3). The top of the nozzle faces, for example, obliquely right downward in the figure such that the centerline of the spray is out of the vertical downward direction. The spray nozzle (42) allows the water from the water pipe (3) to hit the wall of the treatment vessel (11), for example, the path control plate (60), and to flow down to the treatment vessel (11).

In the spray apparatus (40), the water sprayed from each spray nozzle (42) hits the surface of the path control plate (60) to reducing the sizes of the drops (or the droplets), thereby interposing the air between the drops (or the droplets) to increase the electrical resistance. This electrically insulates the water flowing from the inlet pipe (3a) of the water pipe (3) from the water flowing through the treatment vessel (11).

As described above, in this embodiment, each spray nozzle (42) is configured such that the moving distance (Lb) of the water between the top of the spray nozzle (42) and the surface of the water in the treatment vessel (11) is longer than the vertical distance (La) between the top of the spray nozzle (42) and the surface of the water in the treatment vessel (11). This improves the electrical insulation of the inflow-side insulator (80) as compared to the case where the water in the water pipe (3) is supplied from the spray nozzle (42) vertically downward. As in the second embodiment, the electrical insulation between the treatment vessel (11) and the water in the inlet pipe (3a) improves, thereby preventing a current from flowing out of the water treatment unit (10) particularly at the inflow side of the treatment vessel (11).

Eleventh Embodiment of Invention

In an eleventh embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 30:
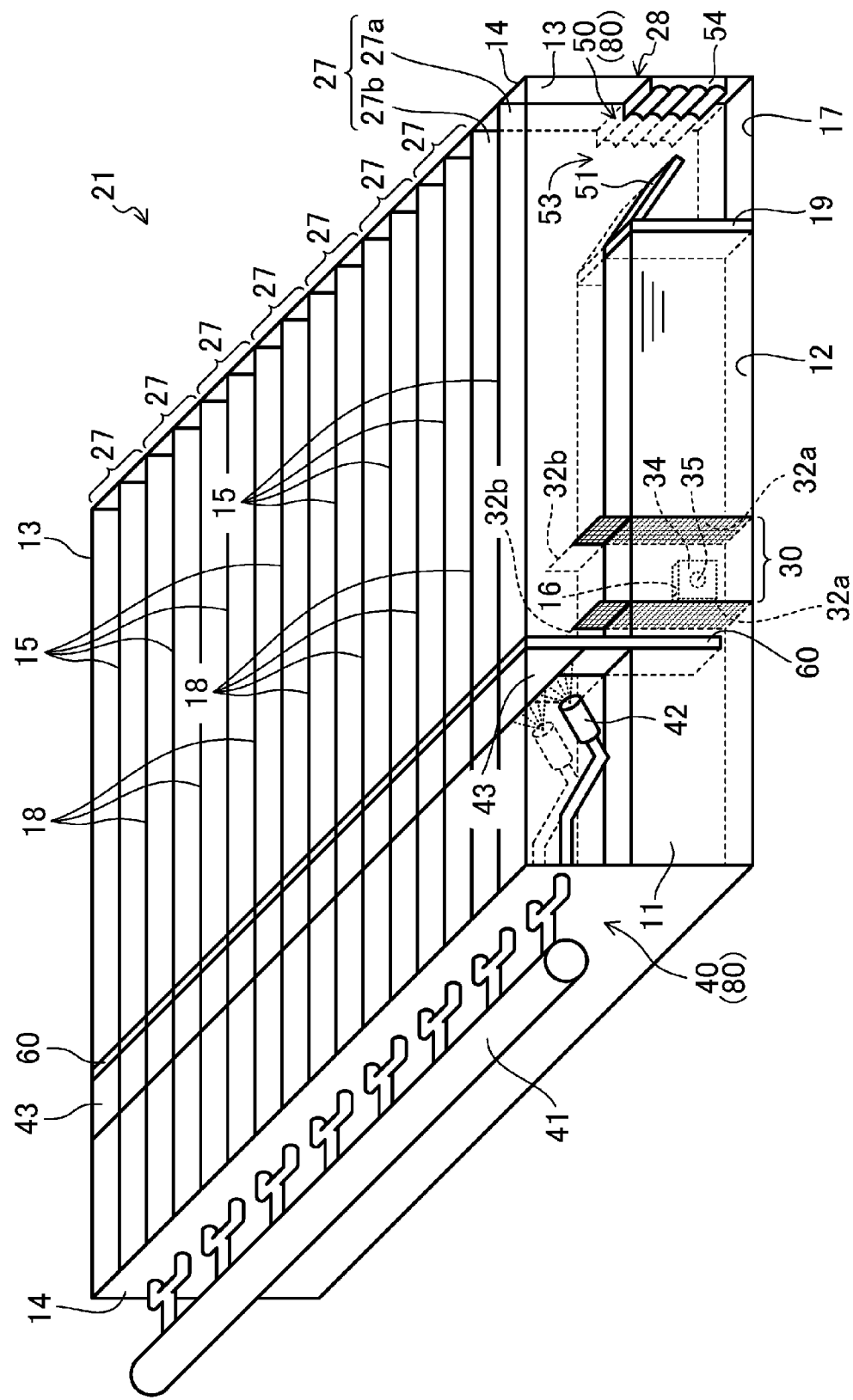
FIG. 30 is a perspective view schematically illustrating a first discharge unit according to an eleventh embodiment.
Figure 31:
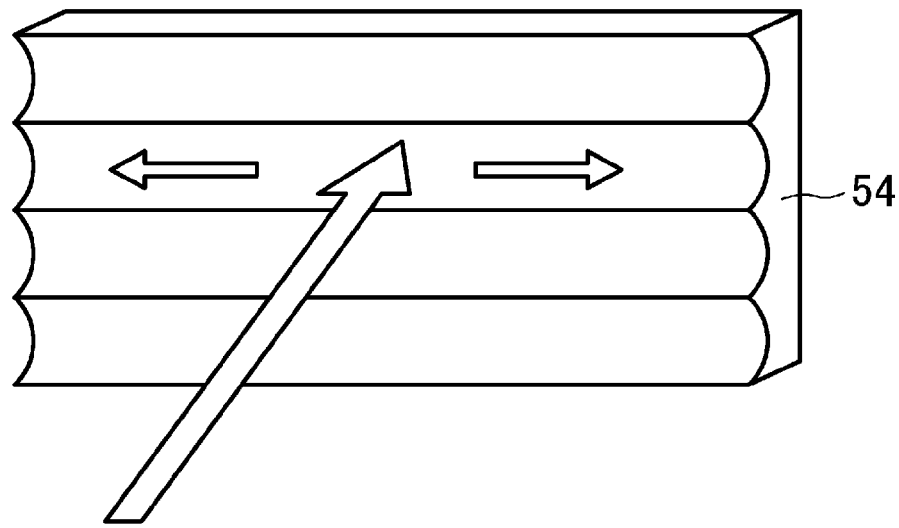
FIG. 31 is a perspective view of a diffusion plate according to the eleventh embodiment.

A fining means (53) according to the eleventh embodiment includes a slope (51), and a diffusion plate (54). The slope (51) allows the water to fall from the upper end of a dam plate (19) of the treatment vessel (11) obliquely right downward in FIG. 30. The diffusion plate (54) is placed on the inner surface of the short wall (14) on the obliquely lower right of the slope (51) in FIG. 30. As shown in FIG. 31, the diffusion plate (54) has a plurality of recesses with a semicircular cross-section. The recesses are adjacent to each other. The water falling down along the slope (51) hits the diffusion plate (54) to be diffused horizontally (i.e., in the direction in which the recesses extend). The surfaces of the slope (51) and the diffusion plate (54) are, for example, coated with Teflon (a registered trademark) to be repellent to water. Thus, in the outflow section (50), when the water treated by the treatment vessel (11) flows over the upper end of the dam plate (19), falls as drops along the surface of the slope (51) as shown in FIG. 30, and is then diffused on the surface of the diffusion plate (54) to flow down to the outlet (17).

In the outflow section (50) with the above-described configuration, when the water, which has flown over the treatment vessel (11), flows down to the surface of the dam plate (19) or the surface of the stored water, flows as drops along the slope (51). The particles of the drops become smaller on the surface of the diffusion plate (54), thereby interposing the air between the drops (or the droplets) to increase the electrical resistance. This enables electrical insulation between the water flowing through the treatment vessel (11) and the water in the treatment vessel (11) at the lower stage.

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the upper treatment vessel (11) and the lower treatment vessel (11), thereby preventing a current from flowing out of the discharge units (21-26) particularly at the outflow sides of the discharge units (21-26).

In the water treatment system (1a) according to this embodiment, the fining means (53) of the outflow section (50) includes the diffusion plate (54), which diffuses the water flowing down from the treatment vessel (11) and allow the water to fall down. The water, which has flown down from the treatment vessel (11), hits the surface of the diffusion plate (54), thereby fining the water. This reduces the particle sizes of the water drops, thereby interposing the air between the drops (or the droplets) to increase the electrical resistance.

In the water treatment system (1a) according to this embodiment, the fining means (53) of the outflow section (50) includes the slope (51), which extends obliquely downward from the upper end of the dam plate (19) to allow the water to fall down. The water, which has flown down from the treatment vessel (11), reliably hits the surface of the diffusion plate (54).

In the water treatment system (1a) according to this embodiment, since the slope (51) is repellant to water, a water film is unlikely to be formed on the slope (51). The water treated by the treatment vessel (11) efficiently becomes drops on the slope (51).

In the water treatment system (1a) according to this embodiment, since the surface of the diffusion plate (54) is repellant to water, a water film is unlikely to be formed on the surface of the diffusion plate (54). The water flowing along the slope (51) efficiently becomes drops on the surface of the diffusion plate (54).

Twelfth Embodiment of Invention

In a twelfth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 32:
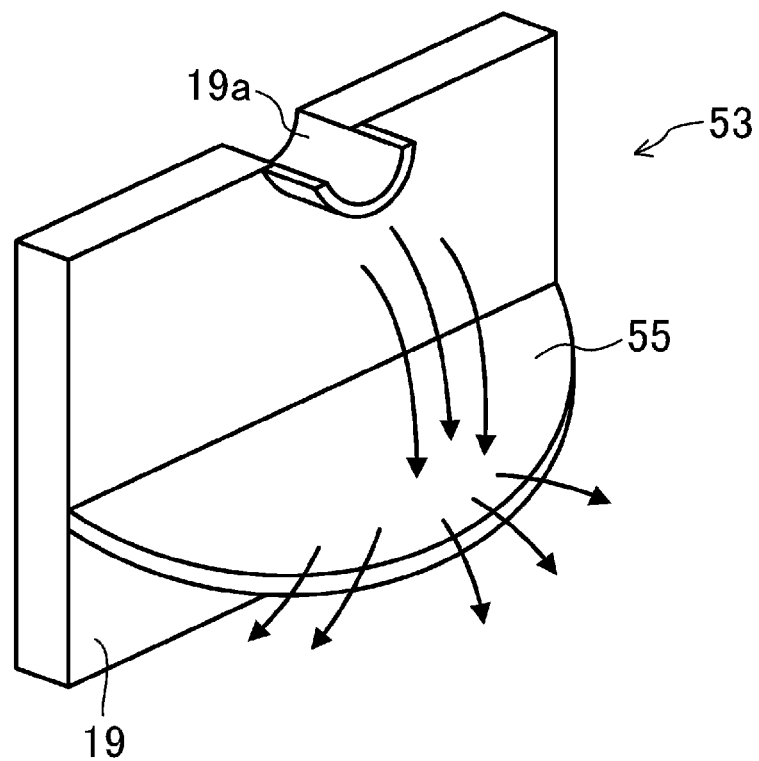
FIG. 32 is a perspective view of a fining means according to a twelfth embodiment.

As shown in FIG. 32, a fining means (53) of the outflow section (50) according to the twelfth embodiment includes an outlet (19a) and a reflector (55). The outlet (19a) is located at the upper end of a dam plate (19) in the figure. The reflector (55) is located at a lower portion of the dam plate (19) in the figure.

As shown in FIG. 32, the outlet (19a) has a U-shaped cross-section.

As shown in FIG. 32, the reflector (55) is in a semicircular shape as viewed from the front. The surface of the reflector (55) is, for example, coated with Teflon (a registered trademark) to be repellent to water. As shown in FIG. 32, when the water falling down from the outlet (19a) hits the reflector (55), the reflector (55) vibrates vertically in the figure to repel the falling water, thereby fining the drops.

In the outflow section (50) with the above-described configuration, when the water supplied from the outlet (19a) of the treatment vessel (11) falls obliquely downward, the particle size of the water decreases on the surface of the reflector (55). The air is then interposed between the drops (or the droplets) to increase the electrical resistance. This electrically insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the water flowing through the upper treatment vessel (11) and the water in the lower treatment vessel (11).

In the water treatment system (1a) according to this embodiment, the fining means (53) of the outflow-side insulator (80) includes the reflector (55), which is hit by the water falling down from the outlet (19a) of the treatment vessel (11), thereby dropping the water to the water pipe (3). The water, which has fallen down from the outlet (19a) of the treatment vessel (11), hits the surface of the reflector (55), thereby fining the water. This reduces the particle size of the water, thereby interposing the air between the drops (or the droplets) to increase the electrical resistance.

Thirteenth Embodiment of Invention

In a thirteenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 33:
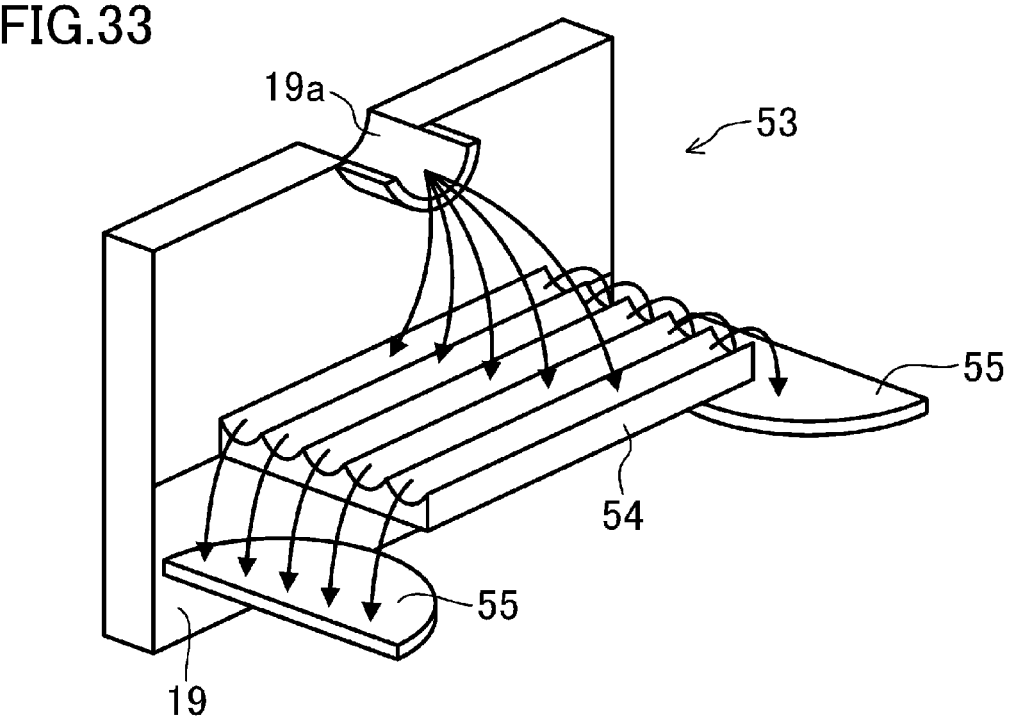
FIG. 33 is a perspective view of a fining means according to a thirteenth embodiment.

As shown in FIG. 33, a fining means (53) according to the thirteenth embodiment includes an outlet (19a), a diffusion plate (54), and a pair of reflectors (55). The outlet (19a) is located at the upper end of a dam plate (19) in the figure. The diffusion plate (54) is located at a lower portion of the dam plate (19) in the figure. Each reflector (55) is located at a lower portion at one side of the diffusion plate (54) in the figure.

In the outflow section (50) with the above-described configuration, when the water, which has flown over the treatment vessel (11), falls obliquely downward, the surfaces of the diffusion plate (54) and the reflector (55) reduce the particle size of the water. The air is then interposed between the drops (or the droplets) to increase the electrical resistance. This electrically insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the upper treatment vessel (11) and the lower treatment vessel (11), thereby preventing a current from flowing out of the discharge units (21-26) particularly at the outflow sides of the discharge units (21-26).

In the water treatment system (1a) according to this embodiment, the fining means (53) of the outflow section (50) includes the reflector (55), which is hit by the water diffused by the diffusion plate (54), thereby dropping the water to the water pipe (3). The surface of the reflector (55) further fines the water, which has once fined on the surface of the diffusion plate (54). This reduces the particle size of the water, thereby interposing the air between the drops (or the droplets) to increase the electrical resistance.

Fourteenth Embodiment of Invention

In a fourteenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 34:
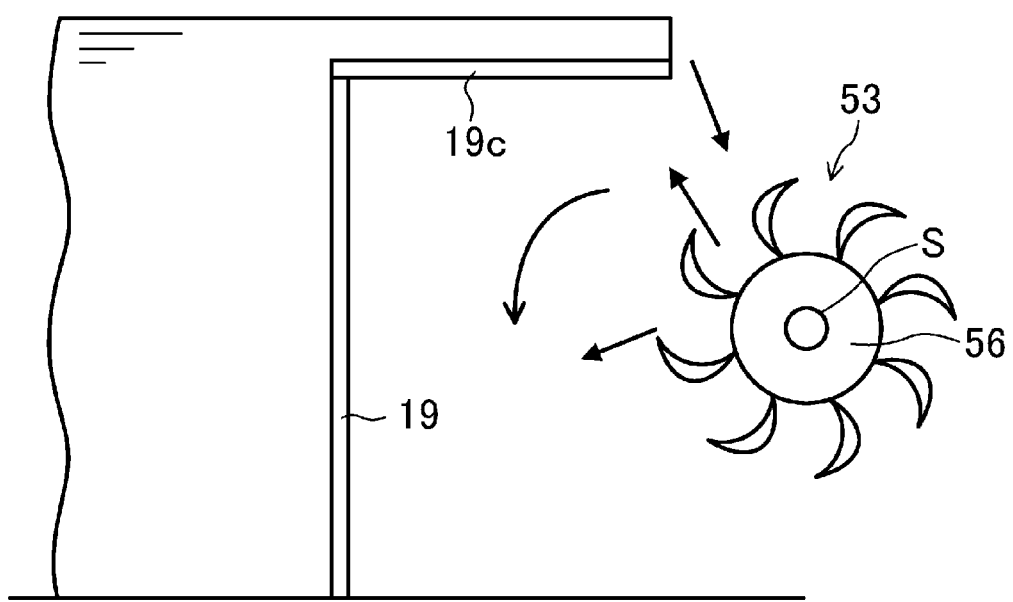
FIG. 34 is a cross-sectional view of a fining means according to a fourteenth embodiment.

As shown in FIG. 34, a fining means (53) according to the fourteenth embodiment includes a projecting wall (19c) and a water wheel (56). The projecting wall (19c) is located at the upper end of a dam plate (19) in the figure. The water wheel (56) is located below the projecting wall (19c) and rotatable on a shaft (S).

In the outflow section (50) with the above-described configuration, when the water supplied from the outlet of the projecting wall (19c) of the treatment vessel (11) falls obliquely downward, the water hits the blades of the water wheel (56). This rotates the water wheel (56) and repels the falling water with the blades of the water wheel (56) to fine the water. The air is then interposed between the drops (or the droplets) to increase the electrical resistance. This electrically insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the upper treatment vessel (11) and the lower treatment vessel (11), thereby preventing a current from flowing out of the discharge units (21-26) particularly at the outflow sides of the discharge units (21-26).

In the water treatment system (1a) according to this embodiment, the outflow section (50) includes the water wheel (56) with the blades hit by the falling water. The hit reduces the particle size of the water, thereby interposing the air between the drops (or the droplets) to increase the electrical resistance.

Fifteenth Embodiment of Invention

In the fifteenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 35:
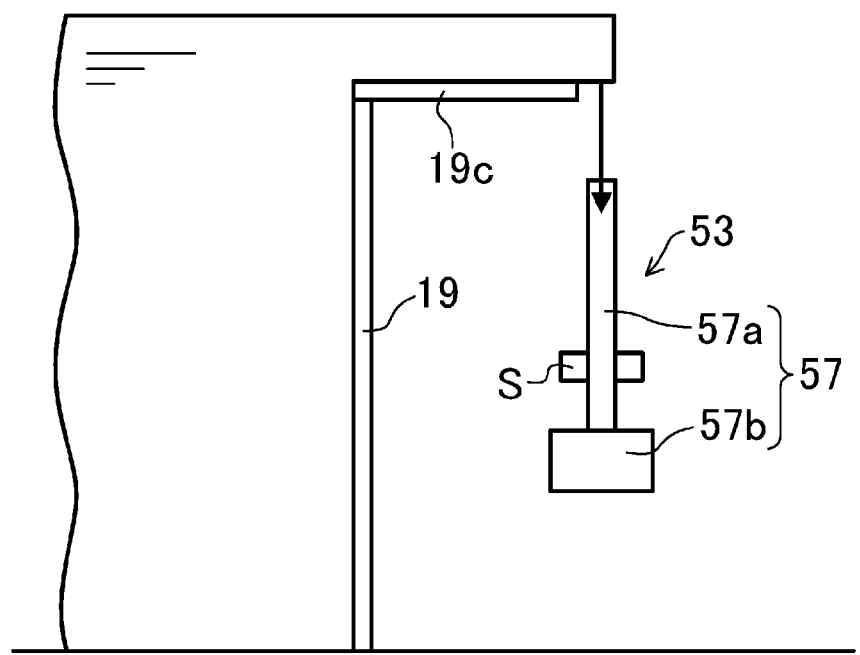
FIG. 35 is a cross-sectional view of a fining means according to a fifteenth embodiment.
Figure 36:
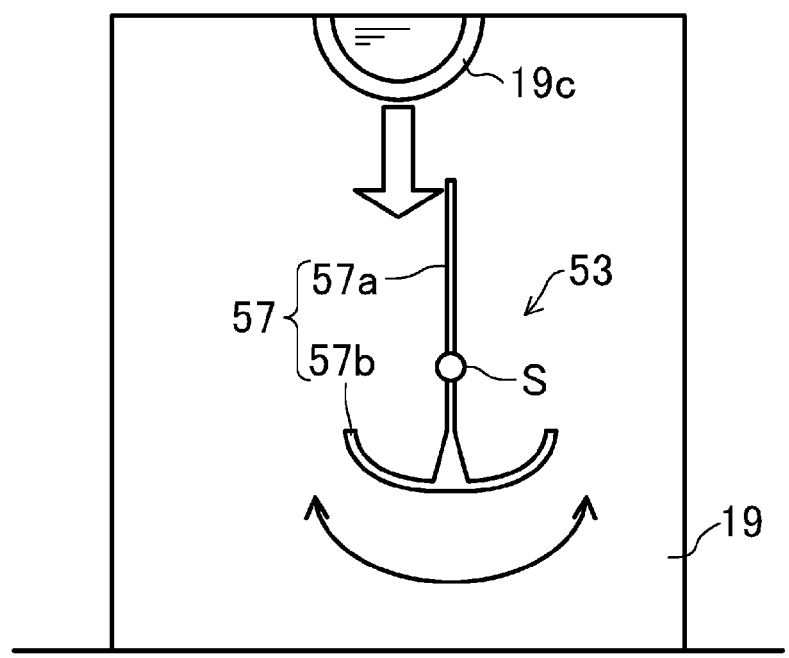
FIG. 36 is a front view of the fining means according to the fifteenth embodiment.

As shown in FIGS. 35 and 36, a fining means (53) according to the fifteenth embodiment includes a projecting wall (19c) and a pendulum member (57). The projecting wall (19c) is located at the upper end of a dam plate (19) in the figure. The anchor-like pendulum member (57) is located below the projecting wall (19c) in the figure to swing on a shaft (S).

Figure 37:
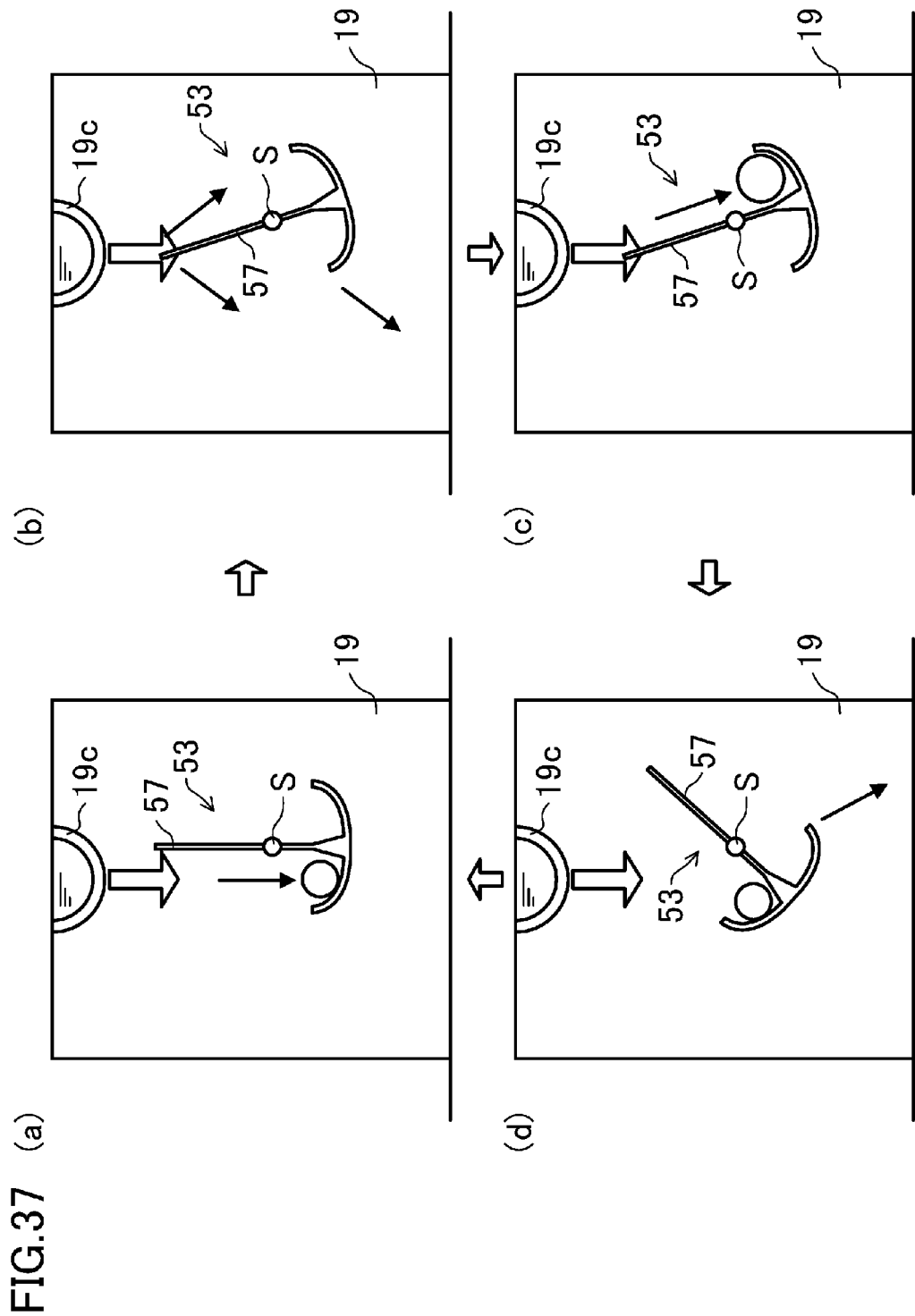
FIG. 37 illustrates the operation of the fining means according to the fifteenth embodiment.

As shown in FIGS. 35 and 36, the pendulum member (57) includes a rod-like hanger (57a) and a water reservoir (57b). The hanger (57a) has a shaft (S) at an intermediate portion. The water reservoir (57b) is like an arc as viewed from above, and fixed to the lower end of the hanger (57a) in the figure. As shown in the state (a) of FIG. 37, the pendulum member (57) receives the water, which is supplied from the outlet of the projecting wall (19c) of the treatment vessel (11), on the left of the water reservoir (57b) in the figure to pivot counterclockwise. Then, as shown in the state (b) of FIG. 37, the hanger (57a) repels the water at the upper portion in the figure and drops the stored water. Next, as shown in the state (c) of FIG. 37, the water reservoir (57b) receives the repelled water on the right in the figure to pivot clockwise. After that, as shown in FIG. 37(d), while the stored water drops, the water reservoir (57b) receives the water, which is supplied from the outlet of the projecting wall (19c) of the treatment vessel (11), on the left in the figure to pivot counterclockwise to returns to the state (a) of FIG. 37.

In the outflow section (50) with the above-described configuration, when the water supplied from the outlet of the projecting wall (19c) of the treatment vessel (11) falls vertically downward, the water hits the pendulum member (57) to allow the pendulum member (57) to pivot. At the same time, the pendulum member (57) repels and fines the falling water, thereby interposing the air between the drops (or the droplets) to increase the electrical resistance. This electrically insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the upper treatment vessel (11) and the lower treatment vessel (11), thereby preventing a current from flowing out of the discharge units (21-26) particularly at the outflow sides of the discharge units (21-26).

In the water treatment system (1a) according to this embodiment, the outflow section (50) includes the pendulum member (57) hit by the falling water. The hit reduces the particle size of the water, thereby interposing the air between the drops (or the droplets) to increase the electrical resistance.

Sixteenth Embodiment of Invention

In a sixteenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 38:
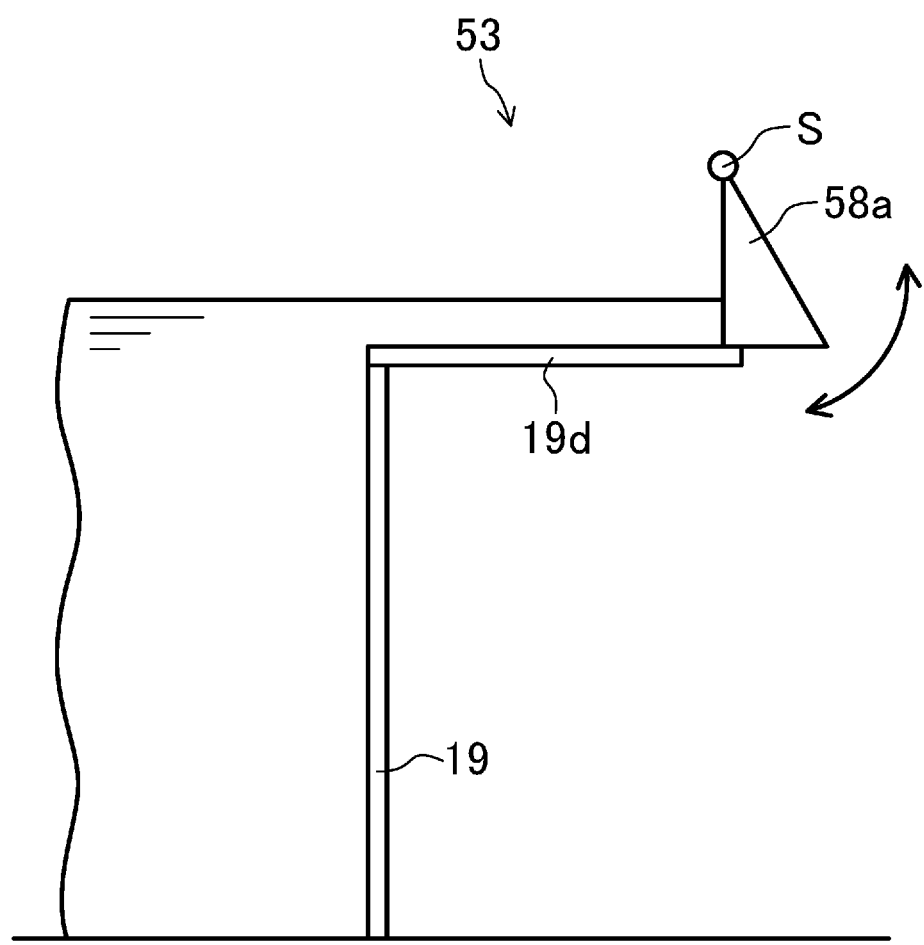
FIG. 38 is a first cross-sectional view of a fining means according to a sixteenth embodiment.
Figure 39:
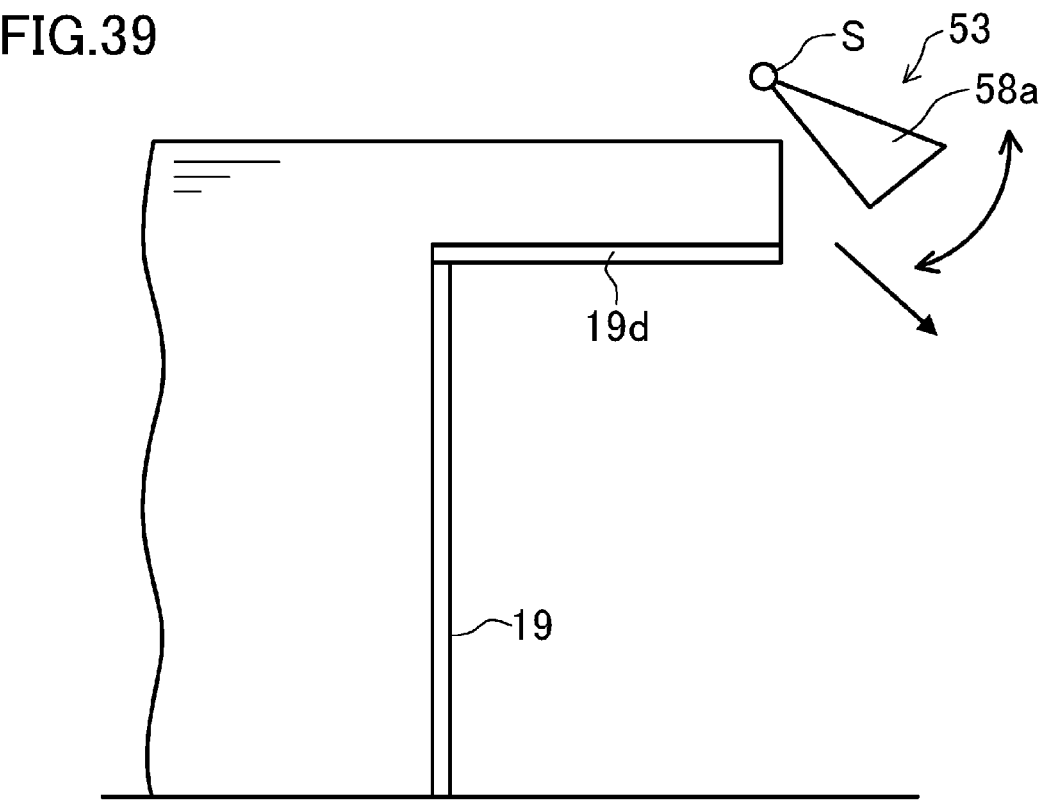
FIG. 39 is a second cross-sectional view of the fining means according to the sixteenth embodiment.
Figure 40:
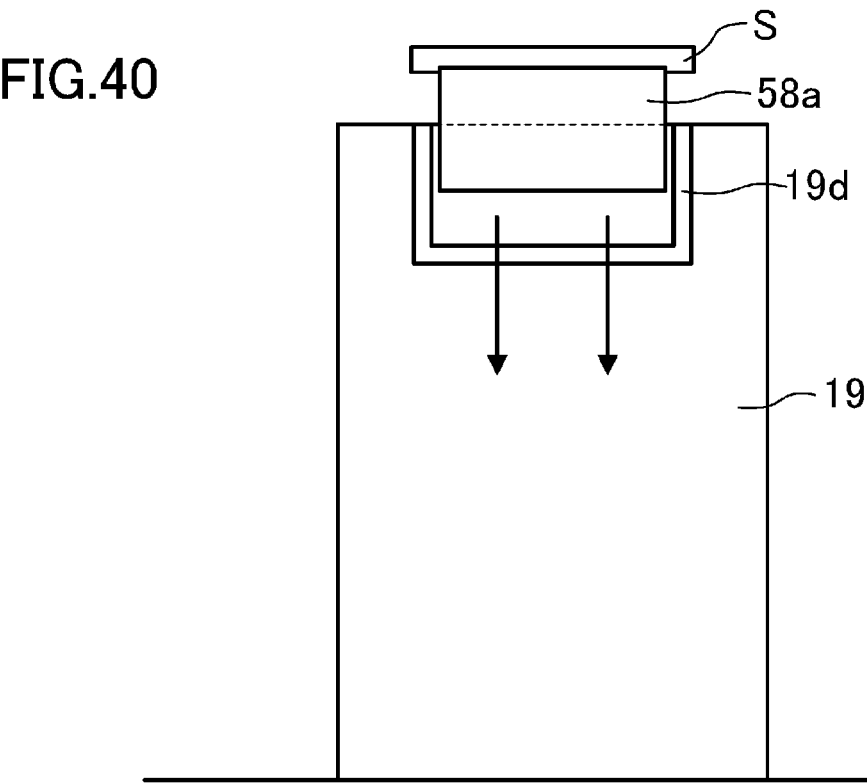
FIG. 40 is a front view of the fining means according to the sixteenth embodiment.

As shown in FIGS. 38-40, a fining means (53) according to the sixteenth embodiment includes a projecting wall (19d) and a gate (58a). The projecting wall (19d) is located at the upper end of a dam plate (19) in FIG. 38. The gate (58a) is located on the right of the projecting wall (19d) in FIG. 38, and pivotable on a shaft (S). As shown in FIGS. 38-40, when a predetermined water is stored on the projecting wall (19d), the gate (58a) pivots counterclockwise on the shaft (S) to open, thereby discharging the water obliquely downward from the top of the gate (58a).

In the outflow section (50) with the above-described configuration, the water intermittently flows like a fall obliquely downward from the outlet of the projecting wall (19d) of the treatment vessel (11). This fines the water to electrically insulate the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the water flowing through the upper treatment vessel (11) and the water in the lower treatment vessel (11).

Seventeenth Embodiment of Invention

In a seventeenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 41:
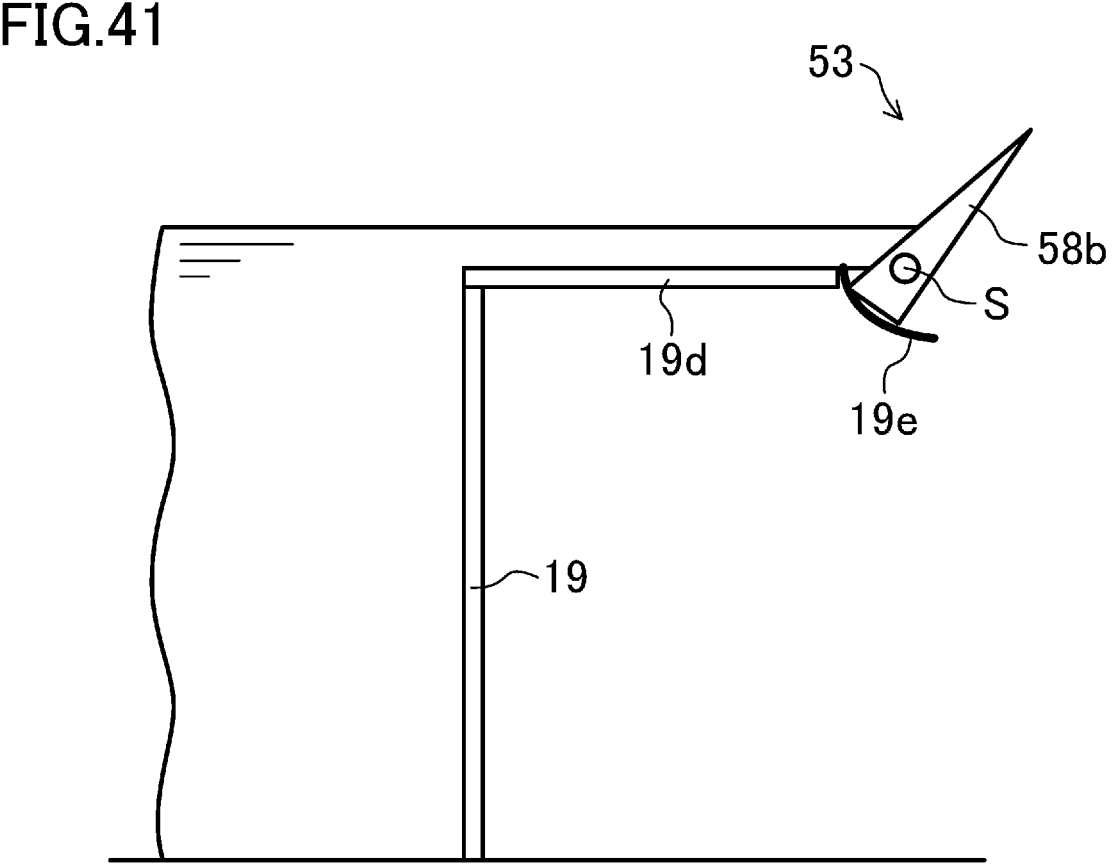
FIG. 41 is a first cross-sectional view of a fining means according to a seventeenth.
Figure 42:
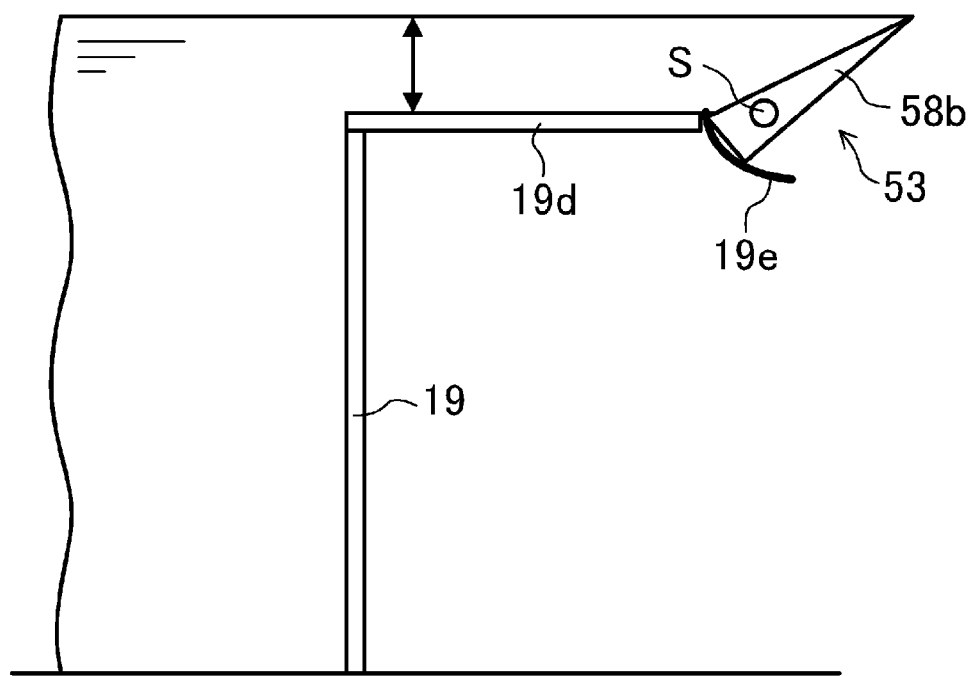
FIG. 42 is a second cross-sectional view of the fining means according to the seventeenth.
Figure 43:
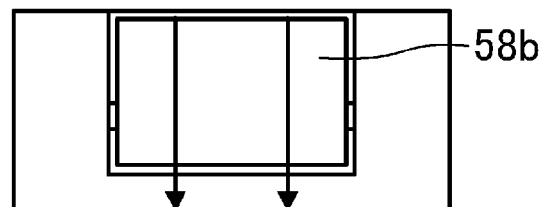
FIG. 43 is a front view of the fining means according to the seventeenth.

As shown in FIGS. 41-43, a fining means (53) of the outflow section (50) according to the seventeenth embodiment includes a projecting wall (19d), a gate (58b), and a seal (19e). The projecting wall (19d) is located at the upper end of a dam plate (19) in FIG. 41. The gate (58b) is located on the right of the projecting wall (19d) in FIG. 41, and pivotable on a shaft (S). The seal (19e) is located at the top of the projecting wall (19d) to block leakage of the water between the projecting wall (19d) and the gate (58b). As shown in FIGS. 41-43, when a predetermined water is stored on the projecting wall (19d), the gate (58b) pivots clockwise on the shaft (S) to open, thereby discharging the water obliquely downward from the top of the gate (58b).

In the outflow section (50) with the above-described configuration, the water intermittently flows like a fall obliquely downward from the outlet of the projecting wall (19d) of the treatment vessel (11). This fines the water, which electrical insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the water flowing through the upper treatment vessel (11) and the water in the lower treatment vessel (11).

Eighteenth Embodiment of Invention

In the eighteenth embodiment, in the outflow section (50), which serves as the outflow-side insulator (80) of each discharge unit (21-26), a fining means fining the drops falling down from each treatment vessel (11) to the lower treatment vessel (11) has a modified configuration.

Figure 44:
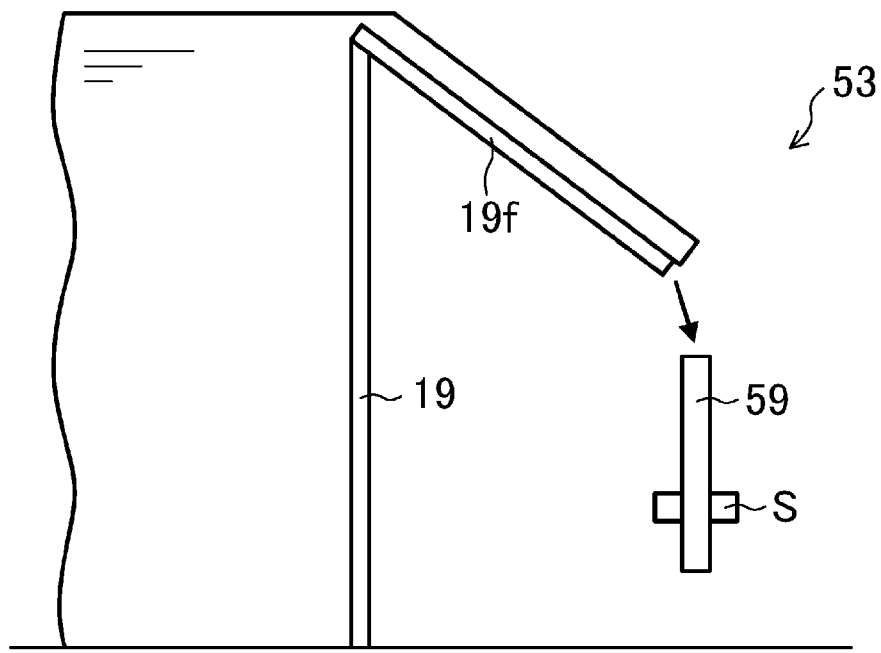
FIG. 44 is a cross-sectional view of a fining means according to an eighteenth embodiment.
Figure 45:
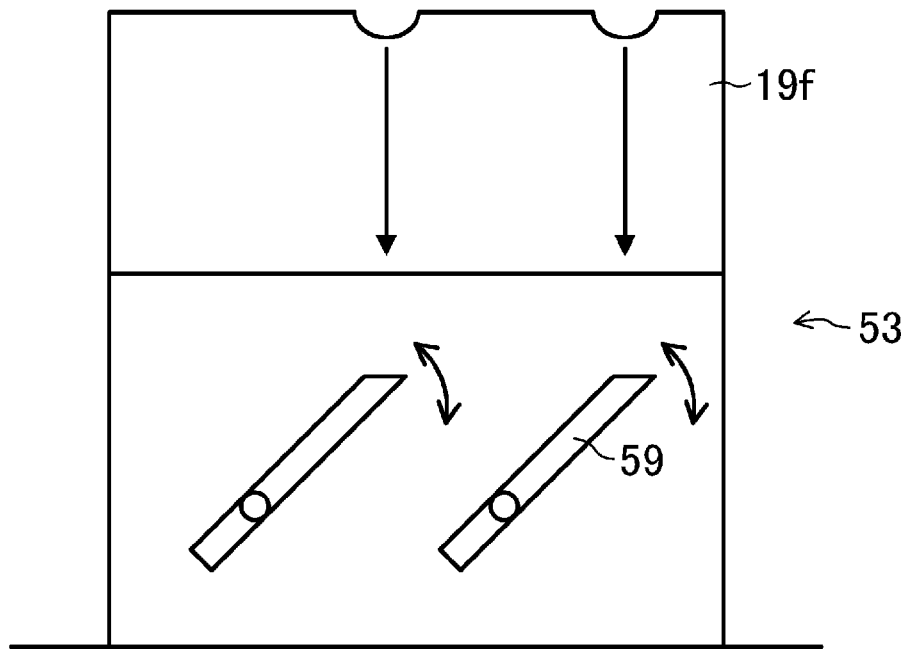
FIG. 45 is a front view of the fining means according to the eighteenth embodiment.

As shown in FIGS. 44 and 45, a fining means (53) according to the eighteenth embodiment includes a slope (190 and a water reservoir member (59). The slope (190 extends obliquely downward from the upper end of a dam plate (19) in FIG. 44 to drop the water. The water reservoir member (59) is located below the slope (191) in the figure, and is in a tubular shape like a shishi-odoshi which is revolvable on a shaft (S).

As shown in FIG. 45, the surface of the slope (190 has a plurality of recesses with a semicircular cross-section. As shown in FIG. 45, the slope (190 allows the water to flow from the bottoms of the recesses of the surface.

As shown in FIGS. 44 and 45, the water reservoir member (59) has the shaft (S) at an intermediate portion. As shown in FIG. 45, when the water is stored inside the water reservoir member (59), the center of gravity moves upward such that the water reservoir member (59) pivots clockwise on the shaft (S), thereby discharging the water inside the water reservoir member (59). Then, the water reservoir member (59) pivots counterclockwise on the shaft (S) and swings to be back to the original position, thereby repelling the falling water.

In the outflow section (50) with the above-described configuration, the water, which has flown over the treatment vessel (11), become drops on the slope (19f) in falling down. The swing of water reservoir member (59) reduces the sizes of the drops, thereby interposing the air between the drops (or the droplets) to increase the electrical resistance. This electrically insulates the water flowing through the treatment vessel (11) from the water in the lower treatment vessel (11).

As described above, in the water treatment system (1a) according to this embodiment, as in the other embodiments, the fining means (53) of the outflow section (50) fines the water treated by the treatment vessel (11) before the water reaches the surface of the water in the lower treatment vessel (11). The air is then interposed between the particles (between the droplets) of the fined water. This improves the electrical insulation between the water flowing through the upper treatment vessel (11) and the water in the lower treatment vessel (11).

In the water treatment system (1a) according to this embodiment, the outflow section (50) includes the water reservoir member (59), which repels the water falling along the slope (19f). This reduces the sizes of the water drops, thereby interposing the air between the drops (or the droplets) to increase the electrical resistance.

Nineteenth Embodiment of Invention

Figure 46:
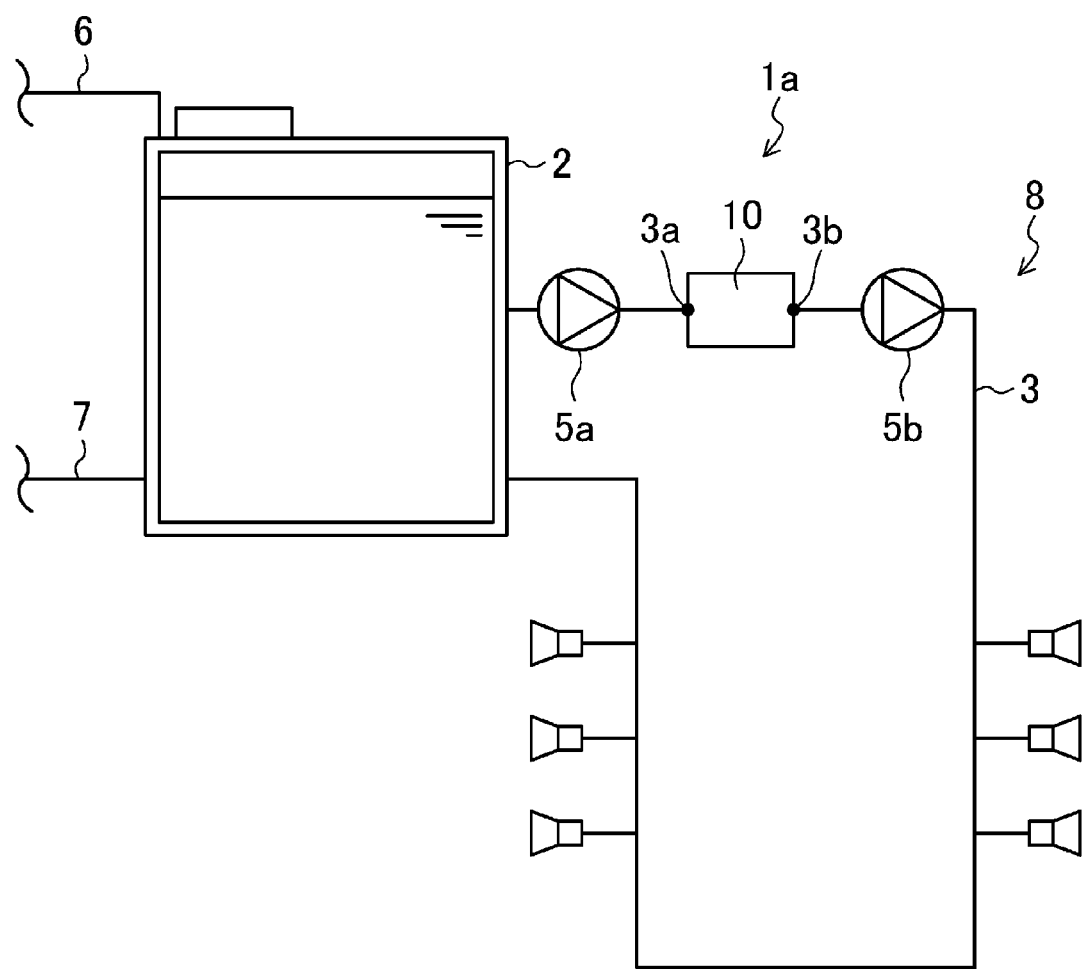
FIG. 46 is a diagram of a piping system illustrating a water treatment system according to a nineteenth embodiment.

In a nineteenth embodiment, the water pipe (3) connected to the water treatment unit (10) of the second embodiment has a modified configuration. Specifically, as shown in FIG. 46, in the nineteenth embodiment, the water pipe (3) is an application-side pipe of the hot water supply circuit (8) connected to the hot water tank (2), which stores the hot water to be supplied. That is, the water treatment unit (10) is connected to the application-side pipe of the hot water supply circuit (8). The water treatment unit (10) is connected between an inflow water pump (5a), which is connected to the application-side pipe, and an outflow water pump (5b).

As described above, the hot water stored in the hot water tank (2) and to be supplied needs to be kept at a high temperature to reduce the growth of bacteria. On the other hand, in this embodiment, the water treatment unit (10) is connected to an intermediate portion of the application-side pipe of the hot water supply circuit (8), which is connected to the hot water tank (2) storing the hot water to be supplied. Thus, the hot water flowing out of the hot water tank (2) is sterilized by bactericidal factors in the water treatment unit (10), which is connected to the intermediate portion of the application-side pipe. There is thus no need to keep the hot water tank (2) at a high temperature to supply the purified hot water to the hot water tank (2). This prevents the supply of the hot water at the unnecessarily high temperature to the application side, thereby reducing the running costs.

This embodiment does not require any heater and any circulation circuit, which have been conventionally used. A heater heats the hot water in the hot water tank (2) to keep the hot water in the hot water tank (2) at a high temperature. A circulation circuit stirs, in the hot water tank (2), the water heated by the heater.

Other Embodiments

In the above-described embodiments, the present invention may have the following configurations.

In the above-described embodiments, the water treatment unit (10, 210) generates a discharge in the target water. In the first aspect of the invention, the water treatment unit (10, 210) may generate electrolysis in target water.

While the inflow-side insulator is the spray (40, 240), it may be a nozzle which drops the target water flowing from the water passage (3, 203) to the water treatment unit (10, 210).

While the water treatment system (1a, 201a) according to the embodiment includes the water circulation circuit (1, 201), the water does not have to circulate in the first aspect of the invention.

The above-described embodiments are preferable examples in nature, and are not intended to limit the scope, applications, and use of the present invention.

INDUSTRIAL APPLICABILITY

As described above, the present invention is used effectively as a water treatment system electrically purifying target water.

DESCRIPTION OF REFERENCE CHARACTERS

203 Water Pipe
210 Water Treatment Unit
211 Treatment Vessel
215 Divider
216 Discharge Hole
221a First Lane
221b Second Lane
222a Third Lane
222b Fourth Lane
231 Electrode (Hot Side)
232 Electrode (Neutral Side)
233 High-Voltage Generator
240 Spray Apparatus
250 Downstream Vessel

The invention claimed is:

1. A water treatment system comprising:
a water treatment unit configured to electrically treat water, wherein
the water treatment unit includes
a first lane and a second lane, which are separated by an electrically insulating plate-like divider, and through which water flows,
a first electrode being in contact with the water of the first lane,
a second electrode being in contact with the water of the second lane,
a power source applying a voltage to the first and second electrodes, and
a through-hole penetrating the divider in a thickness direction and forming a current path between the first and second electrodes through the water,
water is stored in each of the first and second lanes,
the through hole is positioned within the water stored in each of the first and second lanes,
the water treatment system further includes
an inlet through which water introduced to the water treatment unit and divided into the first and second lanes,
an inlet insulator electrically insulating water flowing through the inlet from water flowing through the first and second lanes,
an outlet through which water merged after being flown out of the first and second lanes flows, and
an outlet insulator electrically insulating water flowing through the outlet from the water flowing through the first and second lanes.

2. The water treatment system of claim 1, wherein
the inlet insulator includes a nozzle configured to drop the water flowing through the outlet to each of the first and second lanes.

3. The water treatment system of claim 1, wherein the inlet insulator includes a spray unit configured to spray the water flowing through the outlet to each of the first and second lanes.

4. The water treatment system of claim 1, wherein the outlet insulator allows the water flowing out of the water treatment unit to the water passage to fall down as drops from each of the first and second lanes.

5. The water treatment system of claim 2, wherein
the outlet insulator allows the water flowing out of the water treatment unit to the water passage to fall down as drops from each of the first and second lanes.

6. The water treatment system of claim 3, wherein the outlet insulator allows the water flowing out of the water treatment unit to the water passage to fall down as drops from each of the first and second lanes.

7. The water treatment system of claim 1, wherein
the divider further includes a discharge member made of an electrically insulating material,
the through-hole is positioned in a center of the discharge member, and
the discharge member increases the density of current in the current path between the first and second electrodes such that a current flowing between the first and second electrodes through the through-hole generates bactericidal factors in the water by generating an electric discharge inside a bubble produced in the through hole of the divider.

8. The water treatment system of claim 7, wherein the bubble in the through hole is produced by water in the through hole being vaporized by heat generated from the current flowing between the first and second electrodes through the through hole.

* * * * *